United States Patent
Zahir et al.

(10) Patent No.: US 11,306,238 B2
(45) Date of Patent: Apr. 19, 2022

(54) SHAPE-STABILIZED PHASE CHANGE MATERIALS FOR ENERGY STORAGE

(71) Applicant: KING FAHD UNIVERSITY OF PETROLEUM AND MINERALS, Dhahran (SA)

(72) Inventors: Md. Hasan Zahir, Dhahran (SA); Mohammed Mozahar Hossain, Dhahran (SA); Mohammad Mizanur Rahman, Dhahran (SA); Salhi Billel, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/592,292

(22) Filed: Oct. 3, 2019

(65) Prior Publication Data
US 2021/0102106 A1    Apr. 8, 2021

(51) Int. Cl.
*C09K 5/06*      (2006.01)
*F28D 20/02*    (2006.01)

(52) U.S. Cl.
CPC ............ *C09K 5/063* (2013.01); *F28D 20/023* (2013.01); *Y02E 60/14* (2013.01)

(58) Field of Classification Search
CPC .......... C09K 5/06; C09K 5/063; F28D 20/02; F28D 20/021; F28D 20/023; F28D 20/025; Y02E 60/14; C01F 5/14; C01F 5/145; C01F 5/16; C01F 5/20; C01F 5/22
See application file for complete search history.

(56) References Cited

U.S. PATENT DOCUMENTS

| 4,272,391 | A | * | 6/1981 | Lane ...................... | C09K 5/063 |
| | | | | | 252/70 |
| 5,785,884 | A | * | 7/1998 | Hammond ............... | C09K 5/06 |
| | | | | | 252/70 |
| 7,235,301 | B2 | | 6/2007 | Bacher et al. | |
| 7,923,112 | B2 | | 4/2011 | Christ et al. | |

(Continued)

FOREIGN PATENT DOCUMENTS

| CA | 2 507 476 C | 9/2013 |
| CN | 104556836 A | 4/2015 |

(Continued)

OTHER PUBLICATIONS

Hao et al. ("Porous MgO material with ultrahigh surface area as the matrix for phase change composite," Thermochimica Acta, 604, 2015, 45-51) (Year: 2015).*

(Continued)

*Primary Examiner* — Matthew R Diaz
(74) *Attorney, Agent, or Firm* — Oblon, McClelland, Maier & Neustadt, L.L.P.

(57) ABSTRACT

A heat storage material comprising mesoporous $Mg(OH)_2$ and having pores loaded with a phase change material is described. The heat storage material has a cooling latent heat of 130-140 J/g, and a solidification enthalpy of 120-135 J/g, and a thermal conductivity of 25-45 $W \cdot m^{-1} \cdot K^{-1}$. The phase change material may be polyethylene glycol, and the polyethylene glycol does not leak from the pores of the mesoporous $Mg(OH)_2$ when heating or cooling over phase transitions.

20 Claims, 21 Drawing Sheets

(56) References Cited

U.S. PATENT DOCUMENTS

| | | | |
|---|---|---|---|
| 2010/0116457 A1 | | 5/2010 | Öttinger et al. |
| 2011/0121246 A1* | | 5/2011 | Biggin .................. C09K 5/063 252/71 |

FOREIGN PATENT DOCUMENTS

| | | | |
|---|---|---|---|
| CN | 104928781 B | | 6/2017 |
| CN | 107488020 A | | 12/2017 |
| CN | 107601449 A | * | 1/2018 |
| CN | 108102614 A | | 6/2018 |
| CN | 108365034 A | | 8/2018 |
| JP | 11-166176 A | | 6/1999 |

OTHER PUBLICATIONS

Atinafu et al. ("Synthesis of porous carbon from cotton using an Mg(OH)2 template for form-stabilized phase change materials with high encapsulation capacity, transition enthalpy and reliability," J. Mater. Chem. A., 2018, 6, 8969-8977) (Year: 2018).*

English language machine translation of Jia et al. (CN 107601449 A) (Year: 2018).*

Farhan Lafta Rashid, et al., " Novel Phase Change Materials, MgO Nanoparticles, and Water Based Nanofluids for Thermal Energy Storage and Biomedical Applications", International Journal of Pharmaceutical and Phytopharmacological Research (ELJPPR), vol. 8, Issue 1, Feb. 2018, pp. 46-56.

Dimberu G. Atinafu, et al., "Synthesis of porous carbon from cotton using an Mg(OH)(2) template for form-stabilized phase change materials with high encapsulation capacity, transition enthalpy and reliability", Journal of Materials Chemistry A, Issue 19, Apr. 14, 2018, pp. 8969-8977 (Abstract only).

Md. Hasan Zahir, et al., "Supercooling of phase-change materials and the techniques used to mitigate the phenomenon", Applied Energy, vol. 240, 2019, pp. 793-817.

Yonggan Hao, et al., "Porous MgO material with ultrahigh surface area as the matrix for phase change composite", Thermochimica Acta, vol. 604, Mar. 20, 2015, pp. 45-51 (Abstract only)

* cited by examiner

SHAPE-STABILIZED PHASE CHANGE MATERIALS FOR ENERGY STORAGE

STATEMENT OF ACKNOWLEDGEMENT

This project was prepared with financial support provided by the Deanship of Scientific Research (DSR) at King Fahd University of Petroleum & Minerals (KFUPM) through project No. IN-171036.

BACKGROUND OF THE INVENTION

Technical Field

The present invention relates to a heat storage material comprising mesoporous $Mg(OH)_2$ loaded with a phase change material.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The demand for renewable energy is increasing very rapidly because non-renewable resources are steadily being exhausted, and thus the development of sustainable renewable energy sources has attracted world-wide attention. In this respect, the harvesting of solar energy is dominant. However, the times at which solar energy is available and the periods of high energy utilization are different. Therefore, the storage of solar energy is essential so that it can be released in times of demand. See Guiyin F, Fang T, Lei C. Preparation, thermal properties and applications of shape-stabilized thermal energy storage materials. Renew. Sustain. Energy Rev. 2014; 40: 237-259. A sophisticated energy storage system could also be utilized in waste heat recovery, where similar issues arise. See Mohamed S. A, Al-Sulaiman F. A, Ibrahim N. I, Zahir M. H, Al-Ahmed A, Saidur R, Yllbaş B. S, Sahin A. Z. A review on current status and challenges of inorganic phase change materials for thermal energy storage systems. Renew Sustain Energy Rev. 2016, 70, 1078-1089.

Thermal energy storage systems can be utilized in hot and cold climates, and their availability would resolve the time mismatch between energy supply and demand. Sensible and latent heat storage are the two main approaches to storing thermal energy. Although sensible heat storage can be very efficient due to its high heat storage capacity, it has the drawback that the efficiency of such storage depends on the temperature of the storage material. In practice it is difficult to control the temperature when using this approach to store thermal energy. See Zahir M. H, Mohamed S. A, Saidur R, and Al-Sulaiman F. A, Supercooling of Phase-Change Materials and the Techniques used to Mitigate the Phenomenon, Accepted, in press, *Applied Energy*, 2019; and Kenisarin, M, Mahkamov K, Solar energy storage using phase change materials. Renew Sustain Energy Rev. 2007, 11, 1913-1965. On the other hand, latent heat storage is in high demand because of its high energy storage density and its ability to store heat at a constant temperature. Because of this, latent heat storage PCMs have been extensively studied over the last decade.

Of the available PCMs, organic PCMs have drawn particular attention. For example, PEG is low in cost and exhibits good resistance to erosion, no phase segregation, an insignificant degree of supercooling, minimal toxicity, good thermal and chemical stability properties, a low vapor pressure, and can be directly incorporated into carrier matrices. See Sharma A, Tyagi V V, Chen C. R, Buddhi D, Review on thermal energy storage with phase change materials and applications. *Renew Sustain Energy Rev.* 2009, 13, 318-345; and Chen C, Liu W, Wang Z, Peng K, Xie Q, Novel form stable phase change materials based on the composites of polyethylene glycol/polymeric solid-solid phase change material. *Solar Energy Mater Solar Cells.* 2015, 134, 80-88. However, PEG does exhibit two drawbacks: leaking during PCM phase transition processes and low thermal conductivity. Several groups have attempted to address these leakage problems by encapsulating PEG in a metal or alloy; however, encapsulation creates a further problem in the form of supercooling. Moreover, PCM encapsulation is a complicated and laborious process. See Sharma, R, Ganesan, P, Tyagi V, Mahlia, T. M. I. Accelerated thermal cycle and chemical stability testing of polyethylene glycol (PEG) 6000 for solar thermal energy storage. *Solar Energy Mater Solar Cells.* 2016, 147, 235-239.

A new type of shape-stabilized composite phase change material (ss-CPCM), prepared by combining PEG with a supporting material, has recently been studied in an effort to overcome the leakage problem and to enhance thermal performance. See Sharma et al.; and Karaman S, Karaipekli A, Sari A, Biçer A, Polyethyleneglycol (PEG)/diatomite composite as a novel form-stable phase change material for thermal energy storage. *Solar Energy Mater. Solar Cells* 2011, 95, 1647-1653. Several supporting carrier matrices based on polymers or porous materials have been tested, including polymers such as fatty acid/poly(methyl methacrylate), silica, diatomite, bentonite, expanded vermiculite, perlite, attapulgite, montmorillonite, expanded graphite, and metal foam. See Sari A, Al-Sulaiman F. A, Zahir M. H, Al-Ahmed A, Silica fume/capric acid-palmitic acid composite phase change material doped with CNTs for thermal energy storage, *Solar Energy Mater Solar Cells* 2017, 179, 363-361; and Li W, Zhang R, Jiang N, Tang X F, Shi H F, Zhang X X, et al. Composite macrocapsule of phase change materials/expanded graphite for thermal energy storage, *Energy* 2014, 57, 607-14. Polymer matrices need encapsulation, which increases the synthesis costs. Moreover, serious incompatibility problems can occur because the use of organic capsule shells always increases the heat resistance. Further, organic shells cannot prevent the leakage of melted PCMs. See Qian, T. T, Li J, Ma, H, Yang, J, The preparation of a green shape-stabilized composite phase change material of polyethylene glycol/$SiO_2$ with enhanced thermal performance based on oil shale ash via temperature-assisted sol-gel method. *Solar Energy Mater Solar Cells* 2015, 132, 29-39. In contrast, inorganic materials have the advantages of chemical stability, thermal conductivity, mechanical strength, and fire resistance. Thus, the use of an appropriate inorganic matrix in ss-CPCMs is potentially an effective way to overcome shape instability as well as to enhance thermal stability and conductivity. Some porous inorganic matrixes can easily be prepared and applied directly without encapsulation. See Tang B T, Cui J S, Wang Y M, Jia C, Zhang S F. Facile synthesis and performances of PEG/$SiO_2$ composite form-stable phase change materials. *Sol Energy* 2013, 97, 484-92. Porous materials have attracted great attention in recent years because of their high demand in many industrial fields. In particular, porous materials are essential for gas storage, separation, adsorption, catalysis, sensors biofiltration, and drug delivery. In addition, the porous structure has high demand in the field of renewable energy storage and production. Clean energy production via solid oxide fuel cell can be extensively enhanced when the size of constituent particles become very small i.e., highly porous structures. See Toshio S, Zahir M. H, Yoshiro F, Toshiaki Y, Yoshinobu F, Masanobu A, Impact of anode microstructure on solid oxide fuel cells, Science 2009, 325, 852-855. Yang et al. dispersed PEG into a mesoporous silica structure and prepared a PEG/$SiO_2$ ss-CPCM. See Yang H Z, Feng L L, Wang C Y, Zhao W, Li X G. Confinement effect of $SiO_2$ framework on phase change of PEG in shape-stabilized PEG/$SiO_2$ composites. *Eur. Polym. J.* 2012, 48, 803-10. Zhang et al. reported that nanosize materials with porous matrixes can be utilized in PCM systems to mitigate the supercooling effect. See Shudong Z, Min Z, Xia L, Changzheng W, Yongfu S and Yi X, Macroscaled mesoporous calcium carbonate tetragonal prisms: top-down solid-phase fabrication and applications of phase-change material support matrices, *Cryst Eng Comm* 2010, 12, 3571-3578. Recently, Tingting et al. reported the use of mesoporous calcium silicate to support a PEG-based shape-stabilized composite PCM and found that large latent heats can easily be achieved with PEG molecular weights in the range 1000~6000. See Tingting, Q, Jinhong, L, Xin, M, Yong, D, Weimin, G, Hongwen, M, Polyethylene glycol/mesoporous calcium silicate shape-stabilized composite phase change material: Preparation, characterization, and adjustable thermal property. *Energy* 2015, 82, 333-340. Various shape-stabilized phase change materials composed of PEG and mesoporous matrices have been studied. See Feng L, Zhao W, Zheng J, Frisco S, Song P, Li X, The shape-stabilized phase change materials composed of polyethylene glycol and various mesoporous matrices (AC,SBA-15 and MCM-41). *Solar Energy Mater Solar Cells*, 2011, 95, 3550-3556. It has been found that capillary forces within the matrices and the surface areas of the matrices have significant influence on crystallization and phase change.

MgO and $Mg(OH)_2$ when used as support materials have a higher thermal conductivity (~48.4 W $m^{-1}$ $K^{-1}$) than other oxide materials. See Slifka A. J, Filla B. J, Phelps J. M, Thermal Conductivity of Magnesium Oxide From Absolute, Steady-State Measurements. *J Res Natl Inst Stand Technol.* 1998, 103(4): 357-363. MgO nanoparticles have been prepared with various methods such as pulse laser deposition, laser ablation, and the thermal decomposition of hydroxides or carbonates. See Yang L, May P W, Yin L, Smith J A, Rosser K N. Growth of diamond nanocrystals by pulse laser ablation of graphite in liquid. *Diamond Relat Mater* 2007, 16, 725-9; Tran X. P, H. Bret. H. H, Donald V. M, Yee S, C. Minking K. C, Synthesis of $Mg(OH)_2$, MgO, and Mg nanoparticles using laser ablation of magnesium in water and solvents, *Opt. Laser. Eng.* 2008, 46, 829-834; and Aramendia M, Borau V, Jimenez C, Synthesis and characterization of various MgO and related systems. *J. Mater. Chem.* 1996, 6(12), 1943-1949—each incorporated herein by reference. However, these methods usually produce nanoparticles with relatively large and varied grain sizes, inhomogeneous morphologies, and small surface areas. Cui et al. reported the synthesis of mesoporous MgO with a template-free hydrothermal method, but this approach required calcination of the precursor in air at 600° C. for 2 h. See Cui H, Wu X, Chen Y, Boughton R. I. Synthesis and characterization of mesoporous MgO by template-free hydrothermal method, *Mater Research Bull.* 50 (2014) 307-311.

Although the characteristics of inorganic materials, particularly those of the alkaline and alkaline earth metal nitrates, are promising and advantageous for their use in PCMs, some problems must be overcome for these materials to be used in commercial products. Only the alkaline salts and salt hydrates of Li, Na, K, Mg, Ca, and Ba have been tested as PCM materials; very few studies of PCMs based on alkaline hydroxide powders have been performed. See Kamimoto T. M, Abe Y, Sakamoto R, Kanari K, Ozawa T, Investigation of latent heat-thermal energy storage materials. iv. Thermos analytical evaluation of binary eutectic mixtures of NaOH with LiOH or KOH, *Thermochimica Acta.* 1987, 121, 193-202. Kamimoto et al. tested eutectic mixtures of NaOH with LiOH or KOH as latent heat/thermal energy storage systems, but these eutectic mixtures are so corrosive that even stainless steel does not withstand their melts. In this context, it is worth noting that $Mg(OH)_2$ is a promising candidate because it has been used as a non-toxic flame retardant, a neutralizer of acidic pollutants in water and gases, a filler in the paper industry, an antibacterial agent, and a fertilizer additive. See Balducci G, Diaz L. B, Gregory D. H, Recent progress in the synthesis of nanostructured magnesium hydroxide. *Cryst Eng Comm.* 2017, 19, 6067-6084. One of its interesting properties is the diversity of its microstructures.

Recently, Aziz et al. reported the preparation of In—Sn—O nanoparticles with the hydrothermal method by using the disodium salt of pamoic acid (PA) as an organic additive. See Sulaiman K. O, Aziz A, Zahir M. H, Shaikh M. N, Al-Betar A. R, Oyama M, Hydrothermal synthesis of tin-doped indium oxide nanoparticles using pamoic acid as an organic additive and their photoluminescence properties. *J Mater Sci: Mater Electron*, 2017, 28, 3226-3233. PA has been utilized as a stabilizer, a surfactant, a reductant, and even as a ligand; its use in their study enabled the control of the sizes and shapes of the nanoparticles. PA acts as a capping and reducing agent that stabilizes nano-intermediate products.

In view of the foregoing, one objective of the present invention is the preparation of porous MgO and $Mg(OH)_2$ by the hydrothermal method at low temperatures in the presence or absence of pamoic acid (PA). In one aspect, synthesized phase-pure porous MgO and $Mg(OH)_2$ can be mixed with PEG or a PEG blend in order to fabricate ss-PCMs.

BRIEF SUMMARY OF THE INVENTION

According to a first aspect, the present disclosure relates to a heat storage material. The heat storage material comprises 10-50 wt % mesoporous $Mg(OH)_2$, and 50-90 wt % phase change material, each relative to a total weight of the heat storage material. The mesoporous $Mg(OH)_2$ is in the form of particles with an average diameter in a range of 100 nm-1 μm, and the mesoporous $Mg(OH)_2$ has pores with an average pore size in a range of 5-15 nm. 10-100 wt % phase change material relative to a total weight of the phase change material is located within the pores, and the phase change material is an organic compound.

In one embodiment, the mesoporous $Mg(OH)_2$ is in the form of nanoplatelets, the nanoplatelets having an average diameter in a range of 400-700 nm and an average thickness in a range of 1-20 nm.

In one embodiment, the mesoporous $Mg(OH)_2$ has a surface area in a range of 40-80 $m^2$/g.

In one embodiment, the mesoporous $Mg(OH)_2$ is crystalline with a lattice spacing in a range of 0.260-0.300 nm.

In one embodiment, the organic compound is at least one selected from the group consisting of polyethylene glycol, polyethylene, polypropylene, polyamide, polycarbonates, polyimides, poly(butadiene), poly(isoprene), poly(hydrogenated butadiene), polyetherester elastomer, ethylene/propylene/diene (EPDM) polystyrene, polyvinyl chloride, paraffin, and sugar alcohol.

In a further embodiment, the organic compound is polyethylene glycol, and the heat storage material consists essentially of $Mg(OH)_2$ and polyethylene glycol.

In a further embodiment, the phase change material consists essentially of polyethylene glycol having a weight average molecular weight in a range of 4,000-8,000 Da.

In one embodiment, the heat storage material is substantially free of aluminum.

In one embodiment, the heat storage material, further comprises mesoporous MgO in contact with the mesoporous $Mg(OH)_2$.

In one embodiment, the phase change material has a melting point in a range of 50-65° C.

In one embodiment, the phase change material has a freezing point in a range of 30-40° C.

In one embodiment, the heat storage material has a cooling latent heat in a range of 130-140 J/g.

In one embodiment, the heat storage material has a solidification enthalpy in a range of 120-135 J/g.

In one embodiment, the heat storage material has a thermal conductivity in a range of 25-45 $W \cdot m^{-1} \cdot K^{-1}$.

In one embodiment, less than 10 wt % of the phase change material located in the pores, relative to a total weight of the phase change material located in the pores, exits the pores when the phase change material undergoes a melting or a solidifying transition.

In one embodiment, 80-100 vol % of a total pore volume is occupied by the phase change material.

According to a second aspect, the present disclosure relates to a method for forming the heat storage material of the first aspect. This method involves hydrothermally reacting $Mg(NO_3)_2$, pamoic acid, and $NH_3$ in water in a closed vessel at a temperature in a range of 180-250° C. for 18-30 h to form a suspended precipitate. The suspended precipitate is washed and dried to form mesoporous $Mg(OH)_2$. The mesoporous $Mg(OH)_2$ is mixed with the phase change material in an organic solvent to form a mixture, and the mixture is dried to form the heat storage material.

In one embodiment, the method further comprises heating the mesoporous $Mg(OH)_2$ for 1-6 h at a temperature in a range of 300-500° C.

In one embodiment, the mixture comprises the phase change material at a concentration in a range of 2-7 g/L.

According to a third aspect, the present disclosure relates to a building material comprising the heat storage material of the first aspect.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
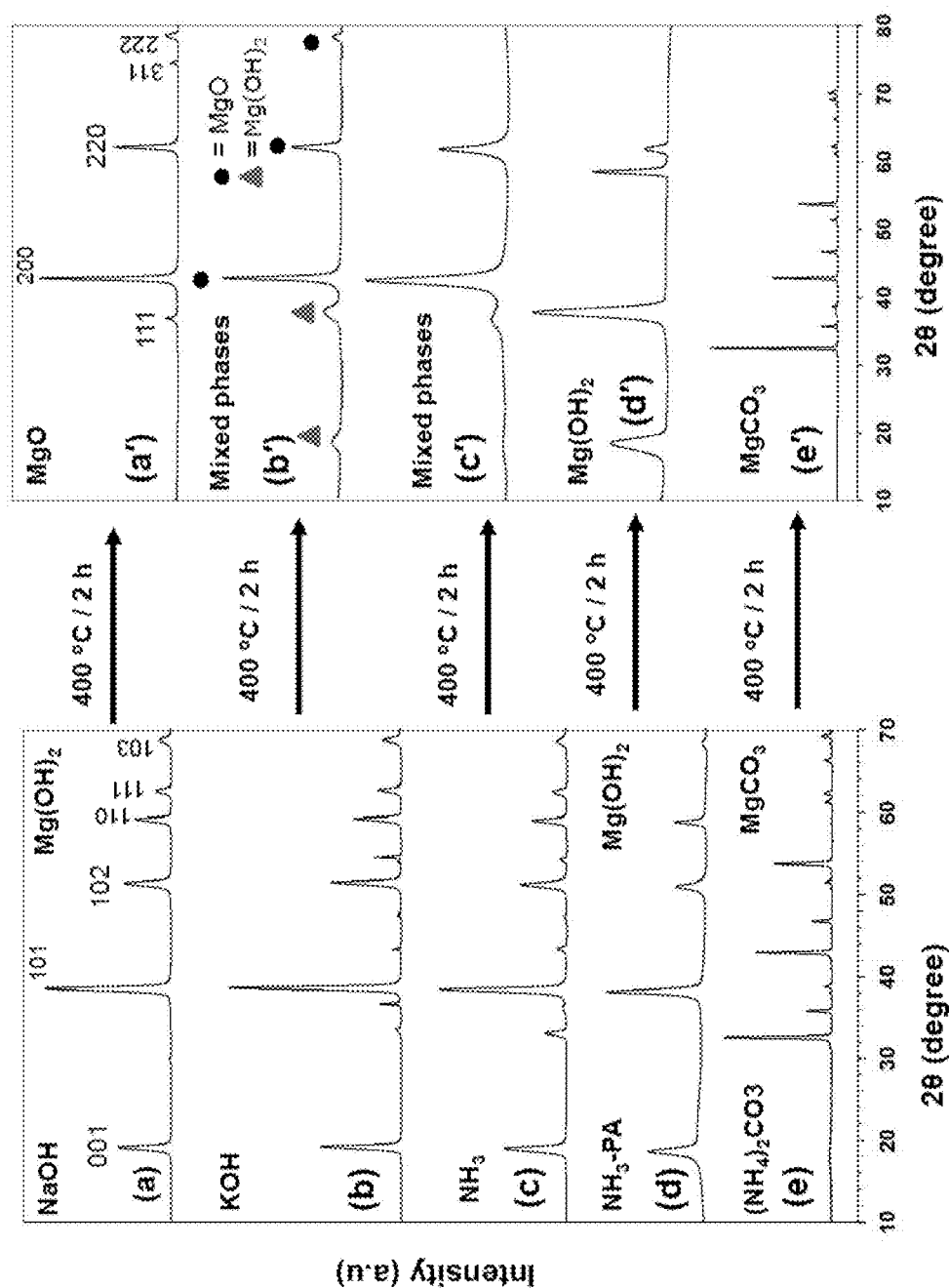
FIG. 1 illustrates XRD patterns of as-synthesized powders prepared by precipitating agents (a) NaOH, (b) KOH, (c) $NH_3$, (d) $NH_3$-PA, and (e) $(NH_4)_2CO_3$ where the corresponding XRD patterns (a'), (b'), (c'), (d'), and (e') are from the respective calcined samples at 400° C. for 2 h.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Mg(NO_3)_2$ includes anhydrous $Mg(NO_3)_2$, $Mg(NO_3)_2 \cdot 6H_2O$, and any other hydrated forms or mixtures.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of magnesium include $^{24}Mg$, $^{25}Mg$, and $^{26}Mg$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a heat storage material. The heat storage material comprises mesoporous $Mg(OH)_2$ at a weight percentage of 10-50 wt %, preferably 15-45 wt %, more preferably 20-40 wt %, even more preferably 25-35 wt %, relative to a total weight of the heat storage material. The heat storage material also comprises a phase change material at a weight percentage of 50-90 wt %, preferably 55-85 wt %, more preferably 60-80 wt %, even more preferably 65-75 wt %, relative to a total weight of the heat storage material. In some embodiments, an excess of the phase change material may be added, so that the heat storage material comprises mesoporous $Mg(OH)_2$ at a weight percentage of less than 10 wt %, less than 5 wt %, less than 2 wt %, and the phase change material may be present at a weight percentage of greater than 90 wt %, greater than 95 wt %, greater than 98 wt %.

The mesoporous $Mg(OH)_2$ is in the form of particles with an average diameter in a range of 100 nm-1 μm, preferably 200 nm-900 nm, more preferably 300-800 nm, even more preferably 400-700 nm, or 450-680 nm, or 500-650 nm. The particles may have a spherical shape, or may be shaped like cylinders, boxes, spikes, flakes, plates, ellipsoids, toroids, stars, ribbons, discs, rods, granules, prisms, cones, flakes, platelets, sheets, or some other shape.

In one embodiment, the particles of mesoporous $Mg(OH)_2$ may be substantially spherical, meaning that the distance from the particle centroid (center of mass) to anywhere on the nanoparticle outer surface varies by less than 30%, preferably by less than 20%, more preferably by less than 10% of the average distance.

In one embodiment, the particles of mesoporous $Mg(OH)_2$ are monodisperse, having a coefficient of variation or relative standard deviation, expressed as a percentage and defined as the ratio of the particle diameter standard deviation (a) to the particle diameter mean (μ), multiplied by 100%, of less than 25%, preferably less than 10%, preferably less than 8%, preferably less than 6%, preferably less than 5%. In a preferred embodiment, the particles of mesoporous $Mg(OH)_2$ are monodisperse, having a particle diameter distribution ranging from 80% of the average particle diameter to 120% of the average particle diameter, preferably 85-115%, preferably 90-110% of the average particle diameter. In another embodiment, the particles of mesoporous $Mg(OH)_2$ are not monodisperse.

In a preferred embodiment, the particles of mesoporous $Mg(OH)_2$ are in the form of platelets or nanoplatelets, having an average diameter in a range as previously described and having an average thickness in a range of 1-20 nm, preferably 2-18 nm, more preferably 3-15 nm, or 4-12 nm, or 5-11 nm, or 6-10 nm. In another preferred embodiment, the particles of mesoporous $Mg(OH)_2$ are in the form of platelets or nanoplatelets, having an average diameter in a range as previously described and having an average thickness in a range of 4-12 nm. In one embodiment, the mesoporous $Mg(OH)_2$ in the form of nanoplatelets may be disc-shaped with an aspect ratio in a range of 1:1-5:1, preferably 1.02:1-1.5:1, more preferably 1.05:1-1.2:1, where the aspect ratio here is the ratio of the length to the width of the flat face of the disc shape.

In one embodiment, the mesoporous $Mg(OH)_2$ may be in the form of agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the particles or nanoplatelets of mesoporous $Mg(OH)_2$ having a mean diameter as previously described.

In one embodiment, the mesoporous $Mg(OH)_2$ has pores with an average pore size in a range of 5-15 nm, preferably 6-14 nm, more preferably 7-13 nm, or an average pore size of less than 40 nm, less than 35 nm, less than 30 nm, less than 25 nm or less than 20 nm. The average pore size may be greater than 2 nm, greater than 3 nm, greater than 5 nm, or greater than 7 nm.

In one embodiment, the mesoporous $Mg(OH)_2$ has an open-cell structure. Solid porous materials can be closed-cell or open-cell. In closed-cell material, the gas forms discrete pockets, i.e. cells, each completely surrounded by the solid material. In open-cell porous materials, the cells connect to each other, and fluid paths usually exist from one side of the porous material to the other side. Thus, open-cell porous materials may be used to filter or absorb fluids. In one embodiment, the mesoporous $Mg(OH)_2$ has a substantially open-cell structure, where less than 15 vol %, preferably less than 10 vol % of the total void volume is confined within closed cells. In one embodiment, the mesoporous $Mg(OH)_2$ may comprise 1-20%, more preferably 2-16%, or 3-5% closed cells, relative to a total number of closed cells and open cells.

In one embodiment, the mesoporous $Mg(OH)_2$ has a void volume of 10-90 vol %, preferably 40-85 vol %, more preferably 45-80 vol % relative to a total bulk volume.

In one embodiment, the mesoporous $Mg(OH)_2$ has a surface area in a range of 40-80 $m^2/g$, preferably 45-75 $m^2/g$, more preferably 48-72 $m^2/g$, even more preferably 50-70 $m^2/g$, or about 63 $m^2/g$. In one embodiment, the surface area described here is a BET surface area.

In one embodiment, the mesoporous $Mg(OH)_2$ is crystalline with a lattice spacing in a range of 0.260-0.300 nm, preferably 0.265-0.295 nm, more preferably 0.270-0.290 nm, even more preferably 0.275-0.285 nm, or 0.277-0.282 nm, or about 0.280 nm. In another embodiment, the mesoporous $Mg(OH)_2$ may be a mixture of crystalline and amorphous phases, for instance, the $Mg(OH)_2$ may comprise 1-15 wt %, or 2-10 wt % amorphous $Mg(OH)_2$ relative to a total weight of the mesoporous $Mg(OH)_2$.

In one embodiment, the heat storage material further comprises mesoporous MgO in contact with the mesoporous $Mg(OH)_2$. For instance, the heat storage material may comprise MgO at a weight percentage of 0.05-40 wt %, 0.1-20 wt %, 0.5-10 wt %, or 0.7-5 wt %, relative to a total weight of the heat storage material. The mesoporous MgO may have pore sizes similar to those described for the mesoporous $Mg(OH)_2$.

Phase change materials are suitable for storing heat energy in the form of latent heat. Phase change materials are understood to be materials that undergo a phase transition when heat is supplied or removed, e.g. a transition from the solid to the liquid phase (melting) or from the liquid to the solid phase (solidification) or a transition between a low-temperature and high-temperature modification. if heat is supplied to or removed from a phase-change material, its temperature on reaching the phase transition point remains approximately constant until the material is completely transformed. The heat supplied or removed during the phase transition, which causes no temperature change in the material, is known as latent heat. Thus, the heat storage material described herein may also be considered a latent heat storage material.

In one embodiment, the phase change material is an organic compound. In a further embodiment, the phase change material is an organic compound comprising only carbon, hydrogen, and optionally oxygen. In another embodiment, the phase change material is an organic compound substantially free of metals and metal ions, for instance, comprising less than 0.1 wt %, less than 0.01 wt %, or about 0 wt % metals and metal ions.

In one embodiment, the organic compound is at least one selected from the group consisting of polyethylene glycol, polyethylene, polypropylene, polyamide, polycarbonate, polyimide, poly(butadiene), poly(isoprene), poly(hydrogenated butadiene), polyetherester elastomer, ethylene/propylene/diene (EPDM) polystyrene, polyvinyl chloride, paraffin, and sugar alcohol. Preferably the organic compound is at least one selected from the group consisting of polyethylene glycol, polyvinyl chloride, paraffin, and sugar alcohol. In one embodiment, the organic compound is polyethylene glycol (PEG), and in other words, the organic compound may consist essentially of polyethylene glycol, meaning that at least 99 wt %, preferably at least 99.5 wt %, more preferably at least 99.9 wt %, even more preferably at least 99.95 wt % of the organic compound (or equivalently, of the phase change material) is polyethylene glycol. In a related embodiment, the heat storage material consists essentially of $Mg(OH)_2$ and polyethylene glycol, meaning that at least 99 wt %, preferably at least 99.5 wt %, more preferably at least 99.9 wt %, even more preferably at least 99.95 wt % or 100 wt % of the total weight of the heat storage material is $Mg(OH)_2$ and polyethylene glycol.

Sugar alcohols include, but are not limited to, ethylene glycol, glycerol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, and polyglycitol. In other embodiments, the organic compound may be a polysaccharide, oligosaccharide, starch, glycogen, pectin, or cellulose. In one embodiment, the phase change material may comprise a polymer and water, or a polymer and a solvent, or a polymer and an aqueous solution.

In one embodiment, the phase change material may comprise two or more organic compounds. For instance, the phase change material may comprise two organic compounds at a mass ratio in a range of 1:10-10:1, preferably 1:5-5:1, more preferably 1:2-2:1, or about 1:1. In another embodiment, the phase change material may comprise two polymers having the same monomeric units but having different molecular weights, for instance polyethylene glycol having a weight average molecular weight of about 1,000 Da, and polyethylene glycol having a weight average molecular weight of about 6,000 Da.

In one embodiment, the organic compound may be a polymer. As used herein a "polymer" refers to a large molecule, or macromolecule, of many repeating subunits and/or substances composed of macromolecules. As used herein a "monomer" refers to a molecule or compound that may bind chemically to other molecules to form a polymer. As used herein the term "repeat unit" or "repeating unit" refers to a part of the polymer whose repetition would produce the complete polymer chain (excluding the end groups) by linking the repeat units together successively along the chain. The process by which monomers combine end to end to form a polymer is referred to herein as "polymerization," monomers are molecules which can undergo polymerization, thereby contributing constitutional repeating units to the essential structures of a macromolecule or polymer. As used herein a "copolymer" refers to a polymer derived from more than one species of monomer and are obtained by the "copolymerization" of more than one species of monomer. Copolymers obtained by copolymerization of two monomer species may be termed bipolymers, those obtained from three monomers may be termed terpolymers and those obtained from four monomers may be termed quaterpolymers, etc. As used herein a "cyclopolymer" refers to a polymer having cyclic structures in the main polymer chain (i.e. the polymer backbone) and are obtained by the "cyclopolymerization" of appropriate monomers where one or more cyclic or ring structures, heterocyclic or homocyclic, are formed. In many cases, the cyclic structures may be formed during the cyclopolymerization which may proceed by an alternating intra-intermolecular chain mechanism for polymerization. As used herein a "cyclocopolymer"

refers to a polymer sharing the definition of a copolymer and a cyclopolymer and may be formed by "cyclocopolymerization." As used herein, "cross-linking" or a "cross-link" refers to polymers and resins containing branches that connect polymer chains via bonds that link one polymer chain to another. The cross-link may be an atom, a group of atoms, or a number of branch points connected by bonds, groups of atoms, or polymer chains. In the majority of cases, a cross-link is a covalent structure or covalent bond, but the term may also describe sites of weaker chemical interactions, portions of crystallites, and even physical interactions and entanglements. The cross-linking can alter the physical and mechanical properties of the polymer. Cross-linking may be formed by chemical reactions that are initiated by heat, pressure, change in pH, and/or radiation, with or without the presence of a cross-linking agent and/or catalyst.

For polymers and macromolecules, the degree of polymerization (DP) is defined as the number of monomeric units within. In one embodiment, the polymer of the phase change material has a degree of polymerization of 100-2500, preferably 100-1500, preferably 100-750, preferably 100-300. In one embodiment, the polymer may be produced by free radical polymerization which often results in a wide molecular weight distribution.

In one embodiment, the phase change material is a polymer having a weight average molecular weight in a range of 4,000-8,000 Da, preferably 4,500-7,500 Da, more preferably 5,000-7,000 Da, even more preferably 5,200-6,800 Da, 5,500-6,500 Da, or about 6,000 Da. In another embodiment, the phase change material is a polymer with a number average molecular weight in the molecular weight ranges described above. Preferably the phase change material is polyethylene glycol having a weight average molecular weight in the ranges as described above.

Dispersity is a measure of the heterogeneity of sizes of molecules or particles in a mixture. The polydispersity index (PDI or heterogeneity index) is a measure of the distribution of molecular mass in a given polymer sample. The PDI is calculated as the weight average molecular weight divided by the number average molecular weight. Typically, dispersities vary based on the mechanism of polymerization and can be affected by a variety of reaction conditions such as reactant ratios, how close the polymerization went to completion, etc. Generally, a decreasing molecular weight distribution increases water solubility and increases flexibility; it can further affect properties including crystallizability, adhesion, mechanical strength, and diffusivity. In one embodiment, the polymer has a PDI of at least 1 and up to 6, preferably up to 5, preferably up to 3, preferably up to 2.5, preferably up to 2, preferably up to 1.5, preferably up to 1.25.

In one embodiment, of the total weight of the phase change material, 10-100 wt %, preferably 50-99.9 wt %, more preferably 60-99.8 wt %, even more preferably 70-99.7 wt % phase change material is located within the pores of the mesoporous $Mg(OH)_2$. In one embodiment, the heat storage material comprises 50-90 wt %, preferably 55-85 wt %, more preferably 60-80 wt %, even more preferably 65-75 wt %, or about 71 wt % of the phase change material relative to a total weight of the heat storage material. In one embodiment, 80-100 vol %, preferably 82-99.9 wt %, more preferably 85-99.8 wt %, even more preferably 90-99.7 wt % of a total pore volume of the mesoporous $Mg(OH)_2$ is occupied by the phase change material. In a related embodiment, 80-100 vol %, preferably 82-99.9 wt %, more preferably 85-99.8 wt %, even more preferably 90-99.7 wt % of a total pore volume that is in fluid communication with the surface of the mesoporous $Mg(OH)_2$ is occupied by the phase change material.

In one embodiment, the phase change material has a melting point in a range of 50-65° C., preferably 52-62° C., more preferably 55-60° C., even more preferably 56-58° C., or about 57° C. Here, the melting point may be of a bulk phase change material located outside of the mesoporous $Mg(OH)_2$ or of the phase change material located within the pores. In a preferred embodiment, the melting point described above is of the phase change material located within the pores of the mesoporous $Mg(OH)_2$.

In one embodiment, the phase change material has a freezing point in a range of 30-40° C., preferably 32-39° C., more preferably 33-38° C., even more preferably 34-37° C., or about 36° C. Here, the freezing point may be of a bulk phase change material located outside of the mesoporous $Mg(OH)_2$ or of the phase change material located within the pores. In a preferred embodiment, the freezing point described above is of the phase change material located within the pores of the mesoporous $Mg(OH)_2$.

In one embodiment, less than 10 wt %, preferably less than 8 wt %, more preferably less than 5 wt %, even more preferably less than 3 wt %, or about 0 wt % of the phase change material located in the pores of the mesoporous $Mg(OH)_2$, relative to a total weight of the phase change material located in the pores, exits the pores when the phase change material undergoes a melting or a solidifying (freezing) transition. In a preferred embodiment, none of the phase change material within the pores exits the pores during single or multiple melting or solidifying transitions.

In one embodiment, the heat storage material has a cooling latent heat in a range of 130-140 J/g, preferably 132-139 J/g, more preferably 133-138 J/g, or about 135 J/g.

In one embodiment, the heat storage material has a solidification enthalpy in a range of 120-135 J/g, preferably 121-132 J/g, more preferably 122-130 J/g, even more preferably 124-128 J/g, or about 127 J/g.

In one embodiment, the heat storage material has a thermal conductivity in a range of 25-45 $W \cdot m^{-1} \cdot K^{-1}$, preferably 26-43 $W \cdot m^{-1} \cdot K^{-1}$, more preferably 27-42 $W \cdot m^{-1} \cdot K^{-1}$, even more preferably 28-40 $W \cdot m^{-1} \cdot K^{-1}$, or about 30 $W \cdot m^{-1} \cdot K^{-1}$.

In one embodiment, the heat storage material is substantially free of metals and metal ions besides magnesium. For instance, the heat storage material comprises less than 0.5 wt %, preferably less than 0.1 wt %, more preferably less than 0.05 wt % non-magnesium metals and metal ions, relative to a total weight of the heat storage material. In one embodiment, the heat storage material is substantially free of aluminum.

According to a second aspect, the present disclosure relates to a method for forming the heat storage material of the first aspect. This method involves hydrothermally reacting $Mg(NO_3)_2$, pamoic acid, and $NH_3$ in water in a closed vessel. The combination of $Mg(NO_3)_2$, pamoic acid, $NH_3$, and water may be considered a reaction mixture. In some embodiments, the reaction mixture may be enclosed within a plastic vessel within a stainless steel vessel.

In one embodiment, the reaction mixture may comprise $Mg(NO_3)_2$ at a concentration in a range of 5-600 mM, preferably 10-200 mM, more preferably 15-100 mM. In a preferred embodiment, the reaction mixture comprises $Mg(NO_3)_2$ at a concentration in a range of 10-200 mM. The reaction mixture may comprise pamoic acid at a concentration in a range of 0.1-100 mM, preferably 0.3-60 mM, more preferably 0.4-10 mM, even more preferably 0.5-6 mM. In a preferred embodiment, the reaction mixture comprises pamoic acid at a concentration in a range of 0.4-10 mM. The reaction mixture may comprise the $NH_3$ at a concentration in a range of 1-50 mM, preferably 2-15 mM, more preferably 3-10 mM, or about 4.1 mM. In a preferred embodiment, the reaction mixture comprises the $NH_3$ at a concentration in a range of 2-15 mM. In one embodiment, the reaction mixture consists of only $Mg(NO_3)_2$, pamoic acid, $NH_3$, and water. In alternative embodiments the reaction mixture may comprise other basic compounds in addition to or in place of the $NH_3$, for example, KOH, or NaOH.

The water may be tap water, distilled water, bidistilled water, deionized water, deionized distilled water, reverse osmosis water, and/or some other water. In one embodiment the water is distilled or treated with reverse osmosis to eliminate trace metals. Preferably the water is deionized, deionized distilled, bidistilled, or reverse osmosis water, and at 25° C. has a conductivity of less than 10 $\mu S \cdot cm^{-1}$, preferably less than 1 $\mu S \cdot cm^{-1}$; a resistivity of greater than 0.1 $M\Omega \cdot cm$, preferably greater than 1 $M\Omega \cdot cm$, more preferably greater than 10 $M\Omega \cdot cm$; a total solid concentration of less than 5 mg/kg, preferably less than 1 mg/kg; and a total organic carbon concentration of less than 1000 µg/L, preferably less than 200 µg/L, more preferably less than 50 µg/L.

In one embodiment, the reaction mixture may have a pH in a range of 7.5-11.0, preferably 8.0-10.0, more preferably 8.5-9.5, or about 9.0, immediately prior to the heating and the hydrothermal reacting. The pH may be adjusted by the amount of $NH_3$ added.

The reaction mixture may be heated to a temperature in a range of 150-250° C., preferably 160-240° C., more preferably 170-230° C., even more preferably 180-220° C., or 190-210° C., or about 200° C. The reaction mixture is hydrothermally reacted for a time period in a range of 18-30 h, preferably 20-28 h, more preferably 22-26 h, or about 24 h.

The hydrothermal reaction forms a suspended precipitate. The suspended precipitate is washed and dried to form mesoporous $Mg(OH)_2$. The mesoporous $Mg(OH)_2$ is mixed with the phase change material in an organic solvent to form a mixture, and the mixture is dried to form the heat storage material.

In one embodiment, the mixture comprises the phase change material at a concentration in a range of 2-7 g/L, preferably 3-6 g/L, more preferably 3.5-5.5 g/L, or about 5 g/L. The mixture may comprise the mesoporous $Mg(OH)_2$ at a concentration in a range of 0.5-5 g/L, preferably 1-4 g/L, 1.5-3.5 g/L, or about 2 g/L. In one embodiment, the organic solvent may be acetone, isopropanol, ethanol, methanol, or butanol. Preferably the organic solvent is ethanol. In one embodiment, the mixture is mixed for a time period in a range of 1-12 h, preferably 2-8 h, more preferably 3-6 h, or about 4 h. The mixture may be dried at a temperature in a range of 50-100° C., preferably 55-90° C., more preferably 60-85° C., or about 80° C., and for a time period in a range of 12-48 h, preferably 18-36 h, more preferably 20-30 h, or about 24 h.

In one embodiment, the method further comprises heating the mesoporous $Mg(OH)_2$ for 1-6 h, preferably 1.5-3 h, or about 2 h at a temperature in a range of 300-500° C., preferably 320-480° C., more preferably 340-460° C., even more preferably 360-440° C., 380-420° C., or about 400° C. Preferably the mesoporous $Mg(OH)_2$ is dry before this heating, and this heating step is carried out in air or inert gas, and before the mesoporous $Mg(OH)_2$ is mixed with the phase change material in the organic solvent.

According to a third aspect, the present disclosure relates to a building material comprising the heat storage material of the first aspect. The building material may be a brick, a tile, a siding, a shingle, a beam, an insulation, a duct, a post, or some other building material. The building material may form part of a window shade, a roof, a wall, a floor, a foundation, an HVAC unit, or a storage tank. The building material may comprise the heat storage material at weight percentage in a range of 0.01-99 wt %, preferably 0.1-90 wt %, more preferably 5-80 wt %, even more preferably 10-75 wt % relative to a total weight of the building material.

The examples below are intended to further illustrate protocols for preparing, characterizing the heat storage material, and uses thereof, and are not intended to limit the scope of the claims.

EXAMPLE 1

Materials

PEG polymers with an average molecular weight of 6000 and 1000 were purchased from the BDH Chemicals. Magnesium nitrate hexahydrate ($Mg(NO_3)_2 \cdot 6H_2O$) and absolute ethanol were purchased from Shanghai Sinopharm Chemical Reagent Co., Ltd. Paomic acid and ammonia $NH_3$ were purchased from Sigma-Aldrich.

EXAMPLE 2

Hydrothermal Method 6.00 g magnesium nitrate salt [$Mg(NO_3)_2 \cdot 6H_2O$] was used in this reaction in which it was dissolved in distilled water. 0.20 g paomic acid was dissolved also in distilled water and added into the above solution. Then, $NH_3$ (4.1 mol cm$^{-3}$) was added to the solution (magnesium nitrate and paomic acid) for co-precipitation of the metallic ions. The pH of the solution was adjusted to 9.00. The pH adjusting agent of the mixture was the $NH_3$ solution at the moment the whole solution was well-stirred. The suspended precipitate was transferred to a plastic container (i.e. strong polymer). Moreover, the container was put into a steel vessel. With the tight closing of the container mouth, the steel container was put in a furnace where the hydrothermal reaction was operating at 200° C. in 24 hours. The powder product was firstly washed with distilled water and ethanol, centrifuged, and eventually dried at 120° C. in an oven. Same procedures were followed for preparing other samples. These samples are precipitate prepared without PA and two other samples were prepared by adding NaOH and KOH for the purpose of comparison.

EXAMPLE 3

Preparation of the PCM Composite

The PCM composite comprising PEG/MgO was prepared by dissolving PEG(6000-1000) (0.5 g) in absolute ethanol (100 mL), and the mesoporous MgO or $Mg(OH)_2$ (0.2 g) was then added to the solution. After stirring for 4 h, ethanol was evaporated at 80° C. for 24 h. The PEG/MgO composite PCM was collected for further characterization.

EXAMPLE 4

Characterization

The X-ray diffraction (XRD) patterns were recorded using a powder X-ray diffractometer (Rigaku Miniflex with a variable slit width) with graphite monochromatized Cu-Kα radiation, operated at 40 kV and 30 mA. A Perkin Elmer (16F PC) spectrometer was used to obtain the FTIR spectra. The electron microscopic images were obtained using a JEOL JSM-6400F field emission scanning electron microscope at an acceleration voltage of 10 kV. Energy dispersive X-ray spectra (EDS) were recorded with an Xmass detector, Oxford Instruments, equipped with Lyra3 TESCAN FE-SEM. TEM images were obtained using a transmission electron microscope (JEOL, JEM 2011) with a 94 k CCD camera (Ultra Scan 400SP, Gatan) operated at 200 kV. The specific surface area, pore volume, and pore diameter of the samples were determined with the Brunauer-Emmett-Teller (BET) and Barrett-Joyner-Halenda (BJH) methods, respectively, from the adsorption isotherms of $N_2$ obtained at 77 K with a NOVA-1200 apparatus.

An X-ray photoelectron spectrometer (XPS) equipped with an Al-Ka micro-focusing X-ray (1486.6 eV) monochromator (ESCALAB 250Xi XPS Microprobe, Thermo Scientific, USA) was utilized to investigate the chemical structure and composition of the mesoporous $15CaMgCO_3$. The resolution of the instrument was 0.5 eV. The chemical composition of the films (prepared using a slurry of 15 $CaMgCO_3$ in ethanol deposited on a glass substrate) were determined using XPS. During the XPS characterization, the specimen chamber was at ambient temperature and at a pressure of $5 \times 10^{-10}$ mbar. The spectra were referenced to the adventitious C 1s peak at 284.5 eV. As the films deposited on glass substrates were used in the XPS analysis, an electron flood gun was used to overcome charging effects for the non-conducting samples. XPS measurements were performed 30 seconds before and after ion etching to verify the actual presence of carbon. Etching was performed using a 2 keV $Ar^+$ ion beam on a 1 $mm^2$ area of the surface, while the ion current at the sample surface was less than 1 µA. Thermogravimetric analysis (TGA) of about 10 mg samples was conducted using a Shimadzu TA-50 thermal analyzer at a heating rate of 10° C./min from room temperature to 600° C. under dry nitrogen. The phase change temperature and the latent heat of the samples were determined using a differential scanning calorimeter (DSC, Q2000). DSC measurements were conducted by heating 10 mg samples sealed in an aluminum pan at a heating rate of 5° C./min under a constant stream of argon at a flow rate of 20 mL/min.

EXAMPLE 5

Results and Discussion
Characteristics of the Synthesized Products—XRD Analysis

Five different precipitating agents, namely NaOH, KOH, $NH_3$, $NH_3$ with pamoic acid, and $(NH_4)_2 CO_3$ were tested in the preparation of MgO and $Mg(OH)_2$ from its nitrate salt ((a) to (e) in FIG. 1. FIG. 1(a) shows that when NaOH was used as the precipitating agent $Mg(OH)_2$ as-synthesized powder was obtained, which could be converted into phase-pure MgO through calcination at 400° C. for 2 h in air (FIG. 1(a), right, top). All the diffraction peaks in FIG. 1(a') correspond to those of cubic MgO, i.e. those in JCPDS card number 45-0946 for space group Fm-3m (225). These very intense and clear peaks indicate that the product has good crystallinity. No peaks due to impurities are evident. In the case of KOH, the as-synthesized product produces a mixture of $Mg(OH)_2$ and MgO diffraction peaks. When $NH_3$ alone is used as the precipitating agent, mixed phases result. In contrast, phase-pure $Mg(OH)_2$ is formed after the addition of $NH_3$ and pamoic acid (FIG. 1(d)). It is surprising that the positions of the peaks in the XRD pattern of $Mg(OH)_2$ prepared by the addition of $NH_3$ and PA do not change, i.e., its phase structure is unaltered, after calcination at 400° C. for 2 h. All the peaks are slightly broader after heat treatment, which indicates that this $Mg(OH)_2$ product has a small grain size. It is likely that the PA acts in this case as a capping agent that stabilizes the nanoparticles. The as-synthesized powders arising from the addition of $(NH_4)_2CO_3$ consist of a pure $MgCO_3$ phase. In all cases, the desired MgO porous support was not obtained from hydrothermal synthesis alone. As discussed above, a calcination step is mandatory in the synthesis of phase-pure MgO with hydrothermal or other processes. Recently, Hao et al. synthesized MgO with a complicated and time-consuming synthesis process that involved the use of Pluronic F127 co-polymer and calcination at a high temperature to produce a porous structure. See Hao Y, Shao X, Liu T, Li B, Nie S. Porous MgO material with ultrahigh surface area as the matrix for phase change composite. Thermochimica Acta, 2015, 604, 45-51—incorporated herein by reference. In the following section, MgO and $Mg(OH)_2$ as referenced are the materials denoted in FIG. 1(a') and (d'), respectively.

Figure 2:
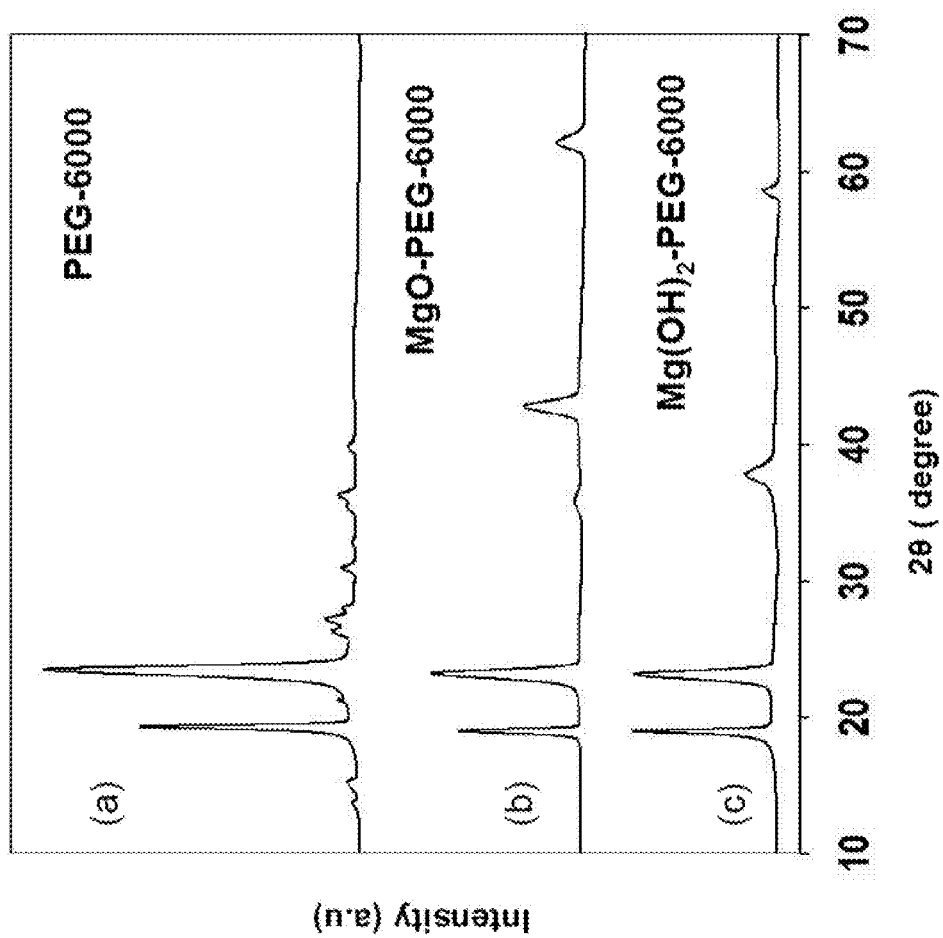
FIG. 2 shows XRD patterns of (a) pure PEG-6000, (b) PEG/MgO, and (c) PEG/$Mg(OH)_2$ composites.

FIG. 2 show the X-ray patterns of (a) PEG-6000 ("PEG") and the composites (b) PEG/MgO and (c) PEG/$Mg(OH)_2$. The X-ray intensities of PEG in the MgO and $Mg(OH)_2$ composites are lower than that of pure PEG. This demonstrates that the pores of MgO and $Mg(OH)_2$ occupied by the melted PEG subsequently cause a decrease in the crystallite size of PEG. The X-ray diffraction pattern of PEG/MgO consists of peaks due to MgO and PEG. In the case of PEG/$Mg(OH)_2$, only PEG and $Mg(OH)_2$ peaks are present, which indicates that the PEG/MgO and PEG/$Mg(OH)_2$ composites are fully mixed and that no chemical interaction has occurred because no new peak was observed.

EXAMPLE 6

FTIR Analysis

Figure 3:
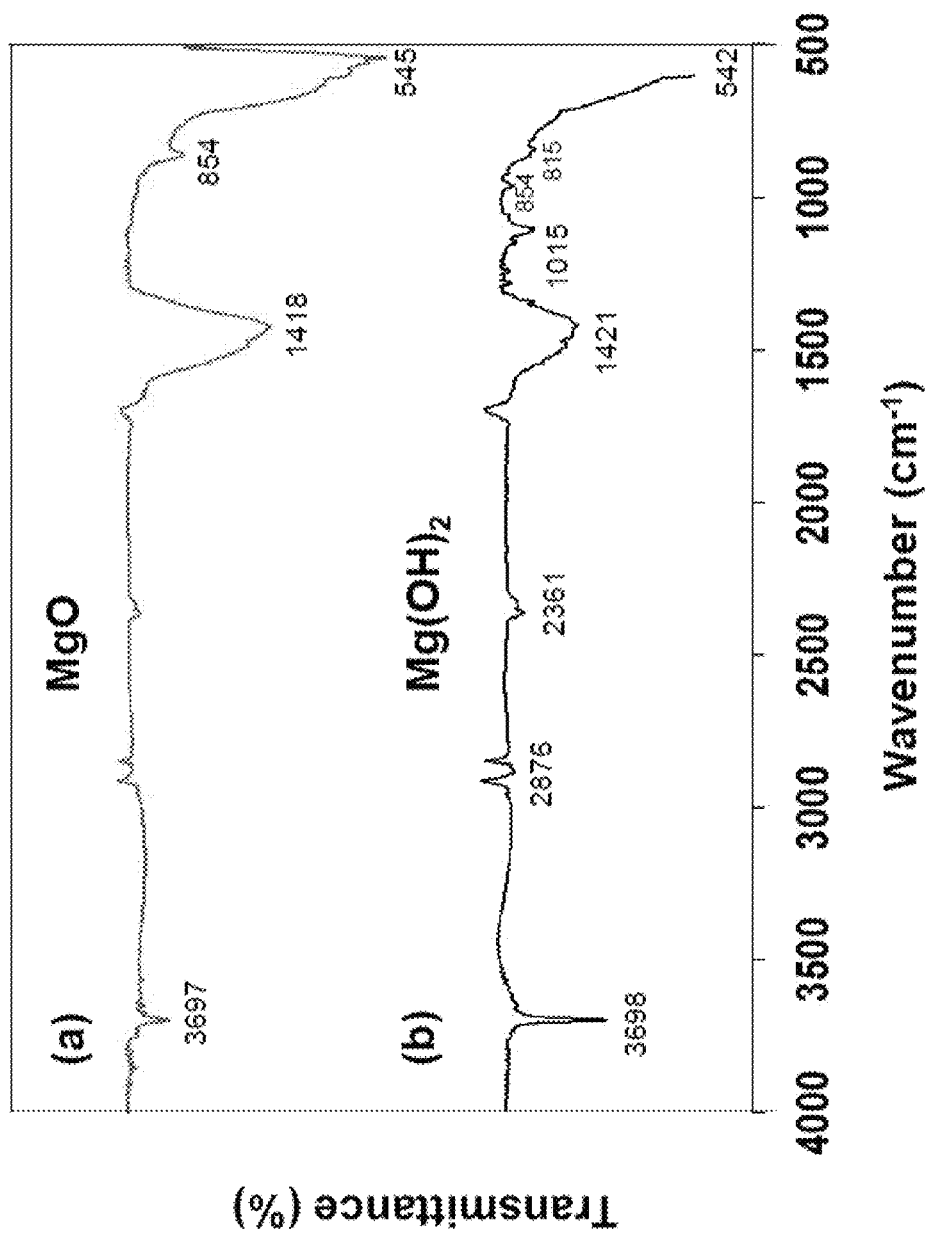
FIG. 3 shows FTIR spectra of XRD patterns from (a) MgO and (b) $Mg(OH)_2$.

FIG. 3 shows the FTIR spectra of (a) MgO and (b) a calcined $Mg(OH)_2$ sample prepared in the presence of $NH_3$ and PA. The band near 3697 $cm^{-1}$ is attributed to the stretching of H—O—H. It is well known that MgO surfaces readily absorb $H_2O$ and $CO_2$ molecules when exposed to the atmosphere. The peaks at 1418 $cm^{-1}$ are assigned to the asymmetrical and symmetrical stretching vibrations of carboxylate (O—C═O), which could be due to the presence of minor impurities in the precursors used during the synthesis process. The absorption band near 854 $cm^{-1}$ is characteristic of cubic MgO. See Yi Ding, Guangtao Zhang, Hao Wu, Bin Hai, Liangbin Wang, and Yitai Qian, Nanoscale Magnesium Hydroxide and Magnesium Oxide Powders: Control over Size, Shape, and Structure via Hydrothermal Synthesis. Chem. Mater. 2001, 13, 435-440—incorporated herein by reference. The characteristic vibrational frequency at 545 $cm^{-1}$ is in good agreement with values reported elsewhere. FIG. 3(b) contain a sharp and intense peak at 3698 $cm^{-1}$, which is due to the —OH group in $Mg(OH)_2$; its intensity is higher than that of the band near 3697 $cm^{-1}$ in the MgO spectrum.

Figure 4:
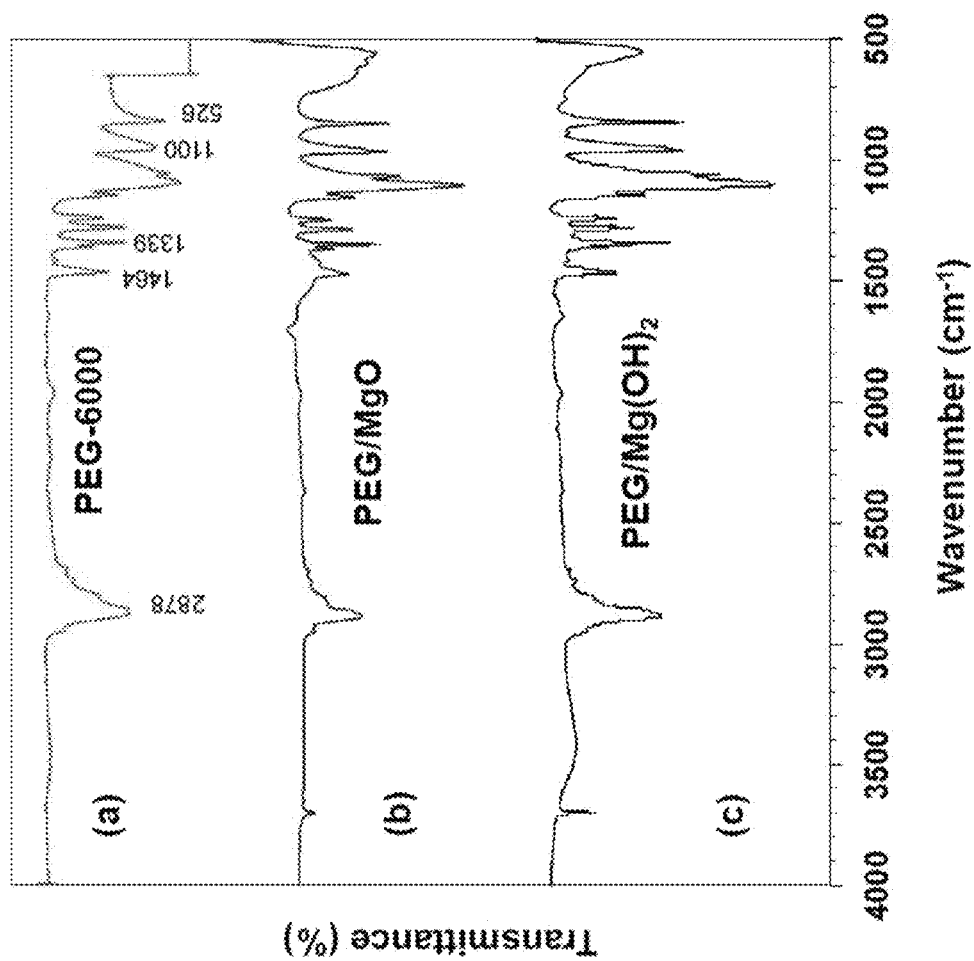
FIG. 4 shows FTIR spectra of (a) pure PEG-6000, (b) PEG/MgO, and (c) PEG/$Mg(OH)_2$ composites.

The interactions between PEG and the supporting materials were characterized by analyzing the samples with FTIR spectroscopy at room temperature. FIG. 4 shows the FT-IR spectra of (a) PEG, (b) MgO/PEG, and (c) a calcined $Mg(OH)_2$/PEG sample. An absorption band at 3698 $cm^{-1}$ due to the stretching of OH groups is evident for all samples except PEG. For the PEG sample, the 2878 $cm^{-1}$ peak is due to aliphatic C—H stretching. The peaks at 1464 and 1339 $cm^{-1}$ are due to C—H bending vibrations. The O—H and C—O—H stretching vibrations produce peaks at 1278 and 1095 $cm^{-1}$ respectively.

In the PEG spectrum, the peak at 1100 $cm^{-1}$ is due to the stretching vibration of C—O—C. The strong peaks at 2878 and 962 cm$^{-1}$ result from the stretching vibrations of the functional group —CH$_2$. See Wang, C.; Feng, L.; Li, W.; Zheng, J.; Tian, W.; Li, X. Shape-stabilized phase change materials based on polyethylene glycol/porous carbon composite: the influence of the pore structure of the carbon materials. *Solar Energy Mater Solar Cells* 2012, 105, 21-26. FIG. 4(*b*) shows the MgO/PEG spectrum, which contains peaks due to both MgO and PEG. No significant new peak is evident; it seems that MgO and PEG are well mixed, with only physical mixing occurring. The FTIR spectrum of PEG/Mg(OH)$_2$ shown in FIG. 4(*c*) contains similar characteristic peaks due to Mg(OH)$_2$ and PEG. There are no additional peaks and no shifts of the individual peaks in the spectrum of the PEG/Mg(OH)$_2$ composite. Therefore, it is concluded that the combination of Mg(OH)$_2$ and PEG results only in the physical absorption of PEG into the Mg(OH)$_2$ matrix, and no chemical interactions arise.

EXAMPLE 7

Microstructures

Figure 5A:
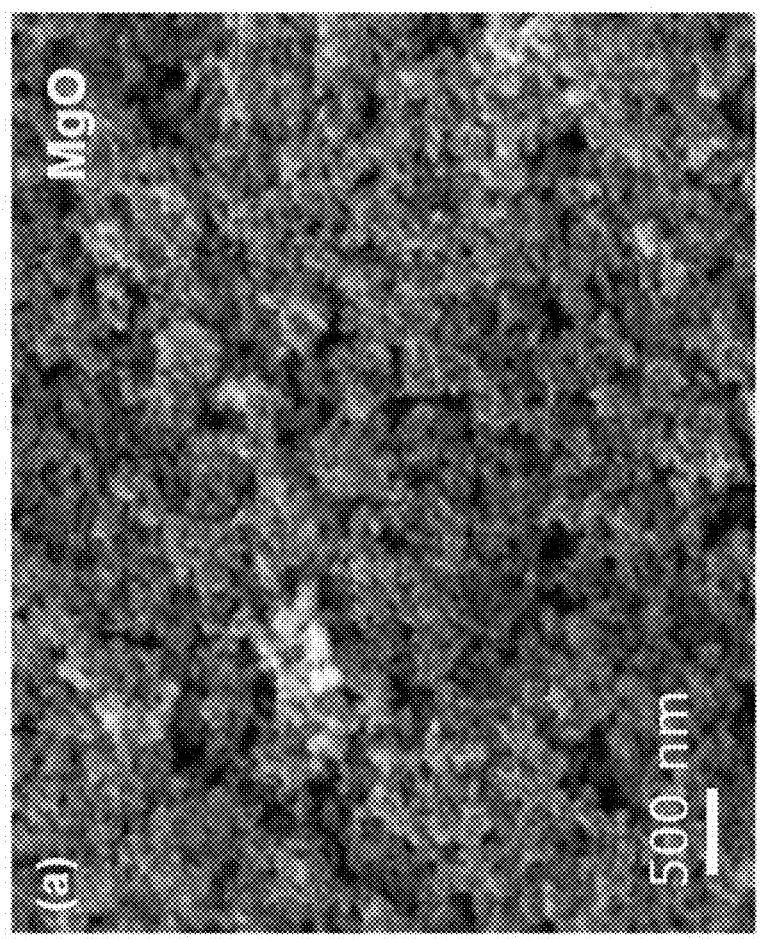
FIG. 5A is an FE-SEM image of MgO.
Figure 5C:
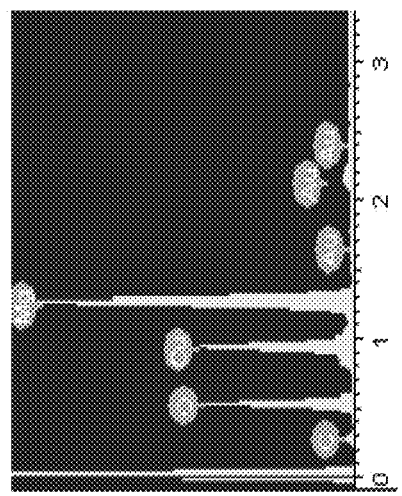
FIG. 5C is an EDX spectrum of the $Mg(OH)_2$ composite.
Figure 5D:
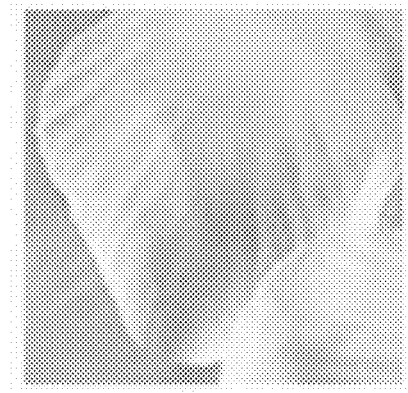
FIG. 5D is an image of rose flower petals.
Figure 5B:
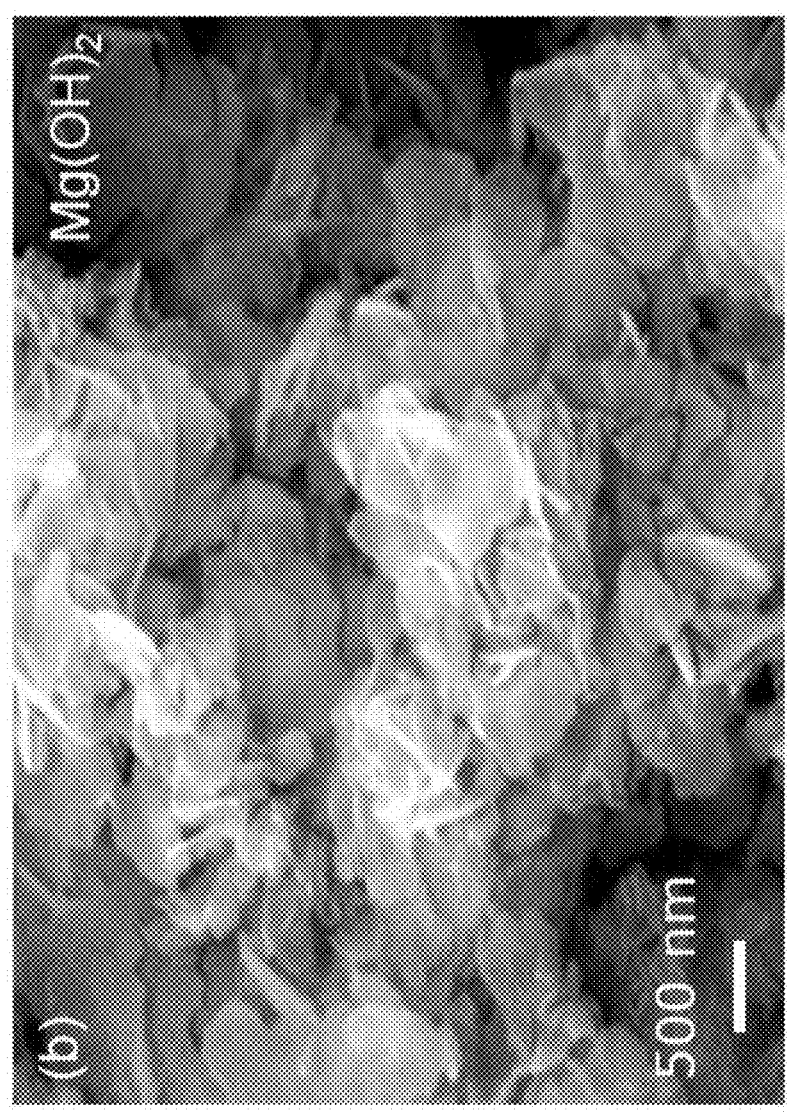
FIG. 5B is an FE-SEM of $Mg(OH)_2$ composite.

The morphologies and microstructures of the MgO and Mg(OH)$_2$ samples after heat treatment at 400° C. for 2 h were examined by performing scanning electron microscopy, and the results are shown in FIGS. 5A-5B. As is typical, the heat treatment results in the agglomeration of the powder due to the interaction between the nanoparticles. The surfaces of the MgO nanoparticles were analyzed and found to exhibit considerable surface roughness. Note also that many pores of macro size and voids are evident in these SEM images (FIG. 5A). The Mg(OH)$_2$ powders in FIG. 5B mainly comprise thin flakes. These flakes look like the nanopetals of rose flowers composed of thinner nanoplates. All the petals have similar shape and size; a real rose petal can be seen in FIG. 5D for comparison. The EDX spectrum in FIG. 5C shows that this pure magnesium oxide sample contains only Mg, O, and gold (Au), which is present in the coating used in preparation for SEM. The SEM mapping indicates that all these elements are homogeneously distributed.

Figure 6B:
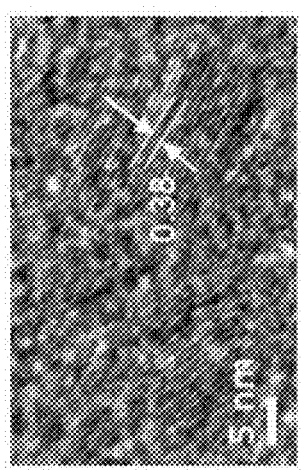
FIG. 6B is an HRTEM image of the region within the circle of FIG. 6A.
Figure 6C:
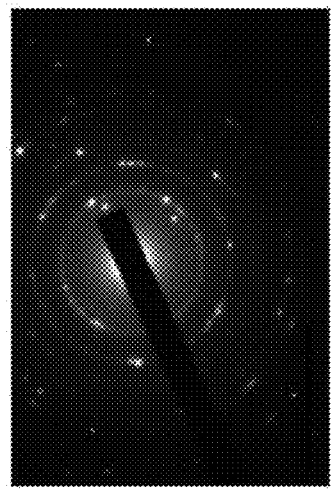
FIG. 6C is the corresponding SAED image from FIG. 6B.
Figure 6A:
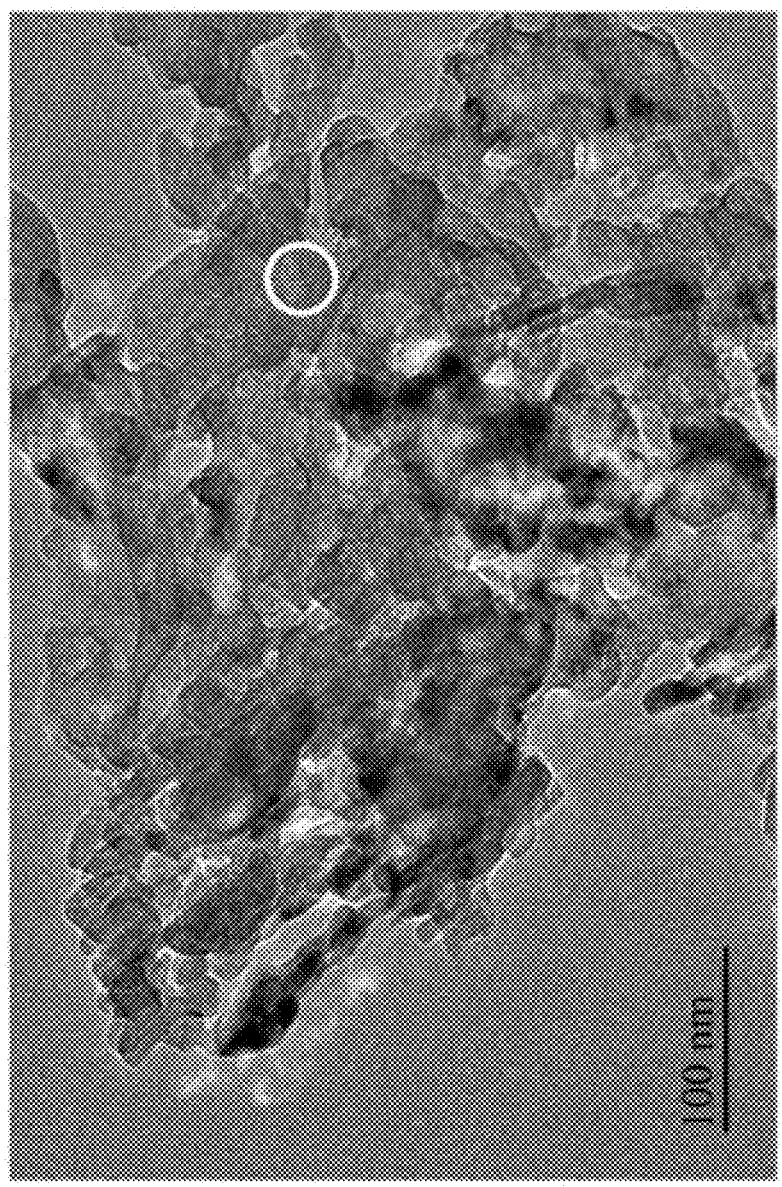
FIG. 6A is a TEM image of MgO.
Figure 6E:
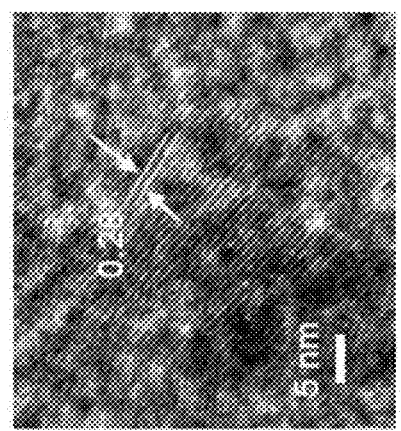
FIG. 6E is an HRTEM image of the region within the circle of FIG. 6D.
Figure 6F:
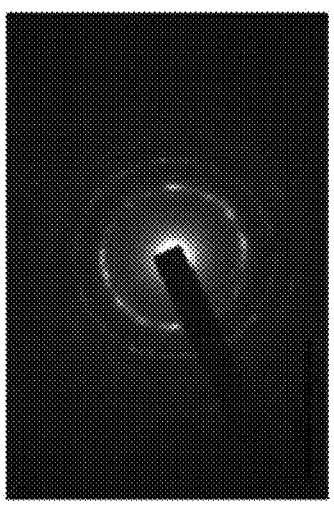
FIG. 6F is the corresponding SAED image from FIG. 6E.
Figure 6D:
FIG. 6D is a TEM image of $Mg(OH)_2$.

FIGS. 6A and 6D shows transmission electron microscopy (TEM) and high-resolution TEM (HRTEM) images of (FIG. 6A) MgO and (FIG. 6D) Mg(OH)$_2$. The TEM images show that the MgO powders mainly comprise agglomerated sheets. The selected area electron diffraction (SAED) pattern (FIG. 6C) was obtained from the area on the MgO surface marked by the white circle in FIG. 6A; the interplanar spacing in the MgO sample is 0.366 nm (FIG. 6B). Furthermore, the SAED pattern (FIG. 6C) contains discontinuous rings, which suggests that this sample comprises polycrystals with an oriented crystallographic axis.

FIG. 6D shows a TEM image of Mg(OH)$_2$. The particles look like clouds floating in the air. Ultrafine particles with large specific surface areas usually readily agglomerate to form larger particles. In this case, pamoic acid (PA) probably reduces the free energy and prevents agglomeration, which restrains the growth of Mg(OH)$_2$. The chemical structure of PA could facilitate the formation of particles with fibrous texture under hydrothermal conditions and subsequent heat treatment. The SAED pattern, FIG. 6F, obtained from the circled region in FIG. 6D, indicates that these fibrous particles are crystalline. The spacing between the lattice fringes was found to be 0.280±0.004 nm (FIG. 6E). The SAED pattern (FIG. 6F) contains rings that are not fully continuous, which suggests that the Mg(OH)$_2$ powders are less crystalline than the MgO powders.

EXAMPLE 8

XPS Analysis

Figure 7:
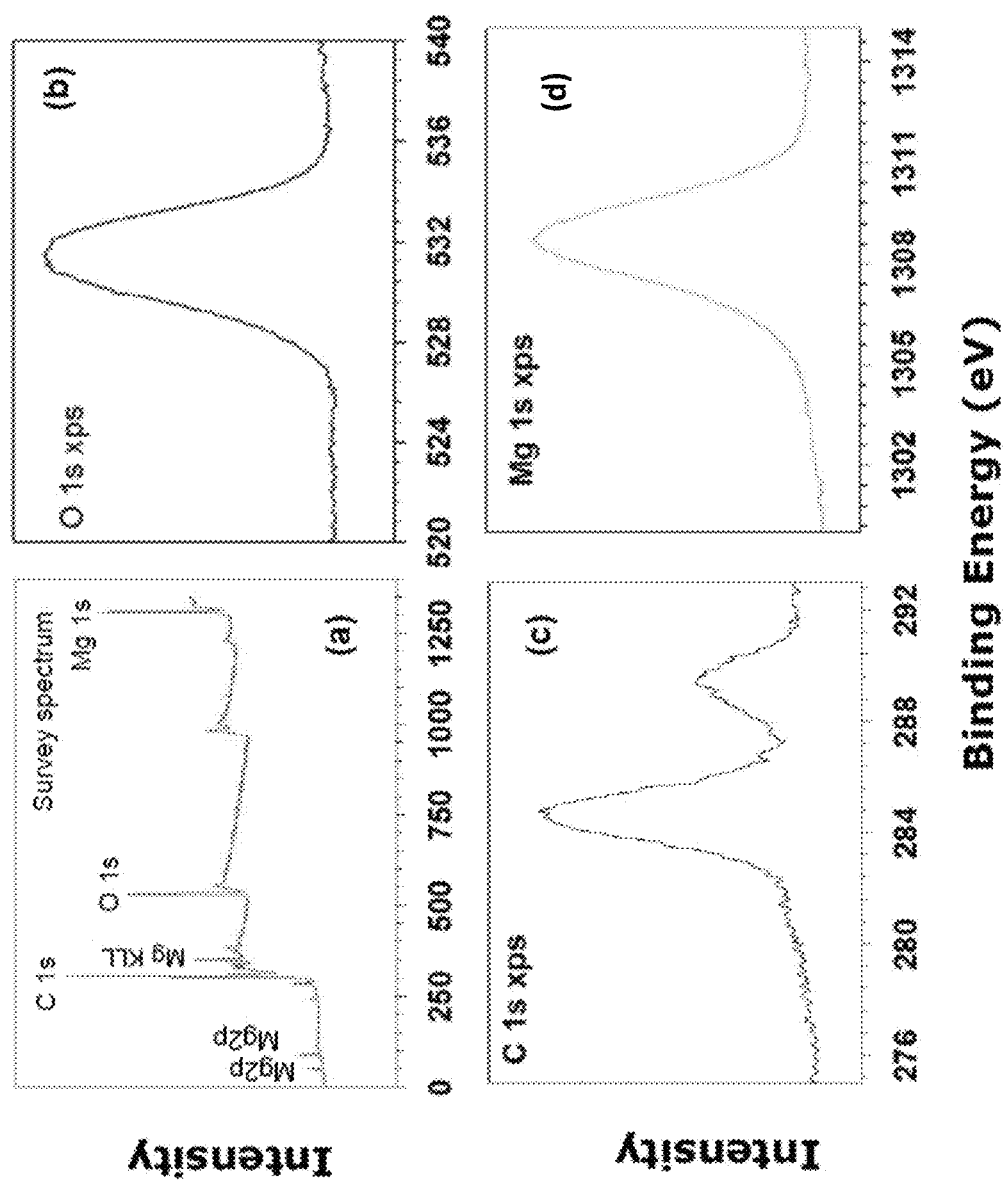
FIG. 7 shows XPS spectra of $Mg(OH)_2$ with (a) survey spectrum, (b) O 1 s region, (c) C 1s region, and (d) Mg 1 s region.

We also examined the surface composition of the Mg(OH)$_2$ sample by recording its XP spectrum, which is shown in (a) of FIG. 7. Characteristic peaks for elemental magnesium, oxygen, and carbon are clearly evident. At high resolution, one Mg is XPS peak can be distinguished at 1307 eV. Two peaks due to carbon species are evident in the C 1s spectrum (c). The C$_{II}$-type peak is due to carbon-oxygen bonds. At 532.5 eV, a broad O 1s XPS peak is evident for the as-prepared sample (spectrum (b)). The Mg 1s core level spectrum can be resolved into three component peaks. The high binding energy component peak is due to Mg(OH)$_2$. The other two component peaks are attributed to Mg and magnesium oxide (results not shown). The O 1s high binding energy component is attributed to oxygen species (such as water) adsorbed onto Mg, which result from the exposure of the sample to air and the hydrothermal process.

EXAMPLE 9

Pore Size Distribution

Figures 8A, 8B:
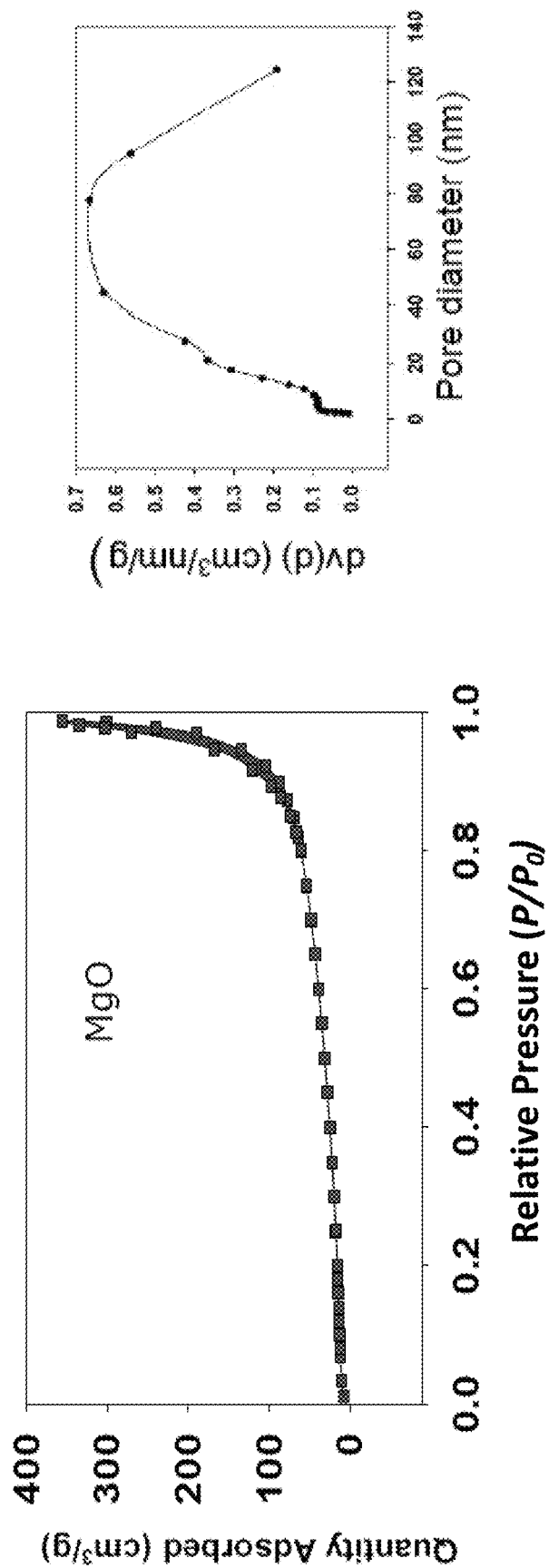
FIG. 8A is a $N_2$ adsorption-desorption isotherm of MgO.
FIG. 8B is the pore diameter distribution of the MgO measured in FIG. 8A.
Figure 8C:
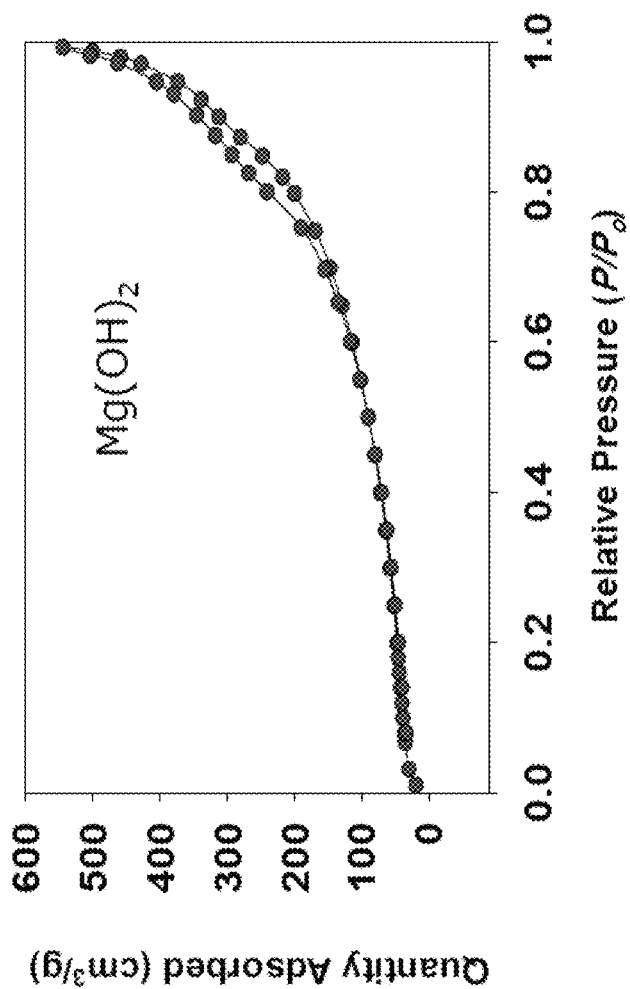
FIG. 8C is a $N_2$ adsorption-desorption isotherm of $Mg(OH)_2$.
Figure 8D:
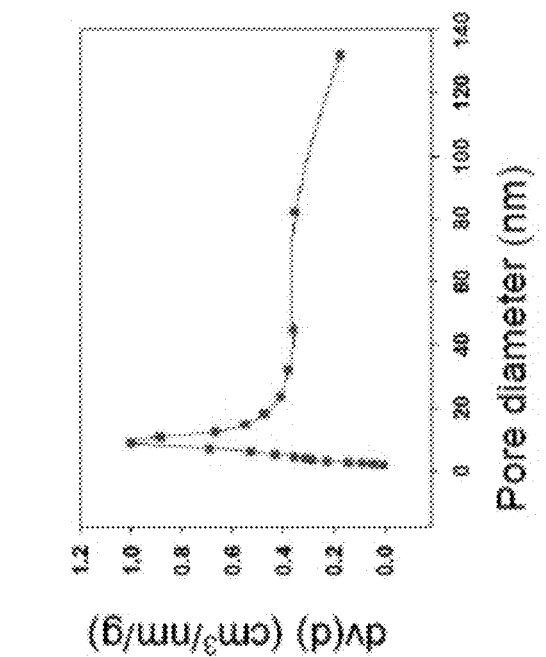
FIG. 8D is the pore diameter distribution of the $Mg(OH)_2$ measured in FIG. 8C.

The nitrogen adsorption-desorption isotherms for the mesoporous MgO and Mg(OH)$_2$ powders are shown in FIGS. 8A and 8C, respectively; the pore size distribution curves for MgO and Mg(OH)$_2$ are shown in FIGS. 8B and 8D, respectively. The isotherm of the MgO powders is in the high P/P$_o$ range (0.8-1.0) with a sharp N$_2$ adsorption-desorption peak, which indicates that the pores range from large mesopores to macropores (FIG. 8A). If the pores of the supporting material in a PCM are too narrow, then its crystalline behavior will be affected and the material will be unable to relax to its lowest energy state. As a result, the latent heat enthalpy is decreased. When a PCM undergoes a melting process, and the pores are too large, then the pores do not provide sufficient capillary force to retain the PCM. The pore size distributions and geometric structures of porous materials can vary widely, which can have high impacts on their crystalline behavior. Mesoporous materials perform better as supports for PCMs according to Py et al., as cited previously. As shown in FIG. 8B, numerous pores with diameters of several tens of nanometers in the range 20 to 120 nm are present on the MgO sample surface, possibly as a result of MgO nanoparticle etching. See Py X, Olives R, Mauran S. Paraffin/porous-graphite-matrix composite as a high and constant power thermal storage material. *Int J Heat Mass Tran*, 2001, 44, 2727-37—incorporated herein by reference.

The Mg(OH)$_2$ sample exhibits a type IV isotherm in FIG. 8C with an apparent H4-type hysteresis loop in the P/P$_o$ range 0.6 to 1, which is indicative of the presence of a mesoporous structure. Therefore, the porous material Mg(OH)$_2$ is expected to be a good support material for shape-stabilized composite PCMs. The surface areas of MgO and Mg(OH)$_2$ were determined to be 184 and 63 m$^2$g$^{-1}$, respectively. The Barrett-Joyner-Halender (BJH) pore size distribution in FIG. 8D indicates that the as-prepared Mg(OH)$_2$ contains pores with sizes generally below 20 nm. Such mesoporous structures are believed to favor the absorption of PEG and thus enhance the thermal dependability of the PEG/Mg(OH)$_2$ PCM during melting and solidification cycles. The pore volume of Mg(OH)$_2$ (FIG. 8D) is significantly lower, which is attributed to the incorporation of PA species into the stacking pores of $Mg(OH)_2$. The MgO sample has a broader pore size distribution than the $Mg(OH)_2$ sample.

Inorganic porous materials are used as supports in many applications because of their high surface area, unique sorption properties, and high thermal stability. See Guiyin Fang, Fang Tang, Lei Cao, Preparation, thermal properties and applications of shape-stabilized thermal energy storage materials, *Renew Sustain Energy Rev.* 2014, 40, 237-259. Their applications in the field of catalysis have been studied extensively, but their use in PCMs has only rarely been explored.

EXAMPLE 10

Thermal Stability of the Composites

Figure 9:
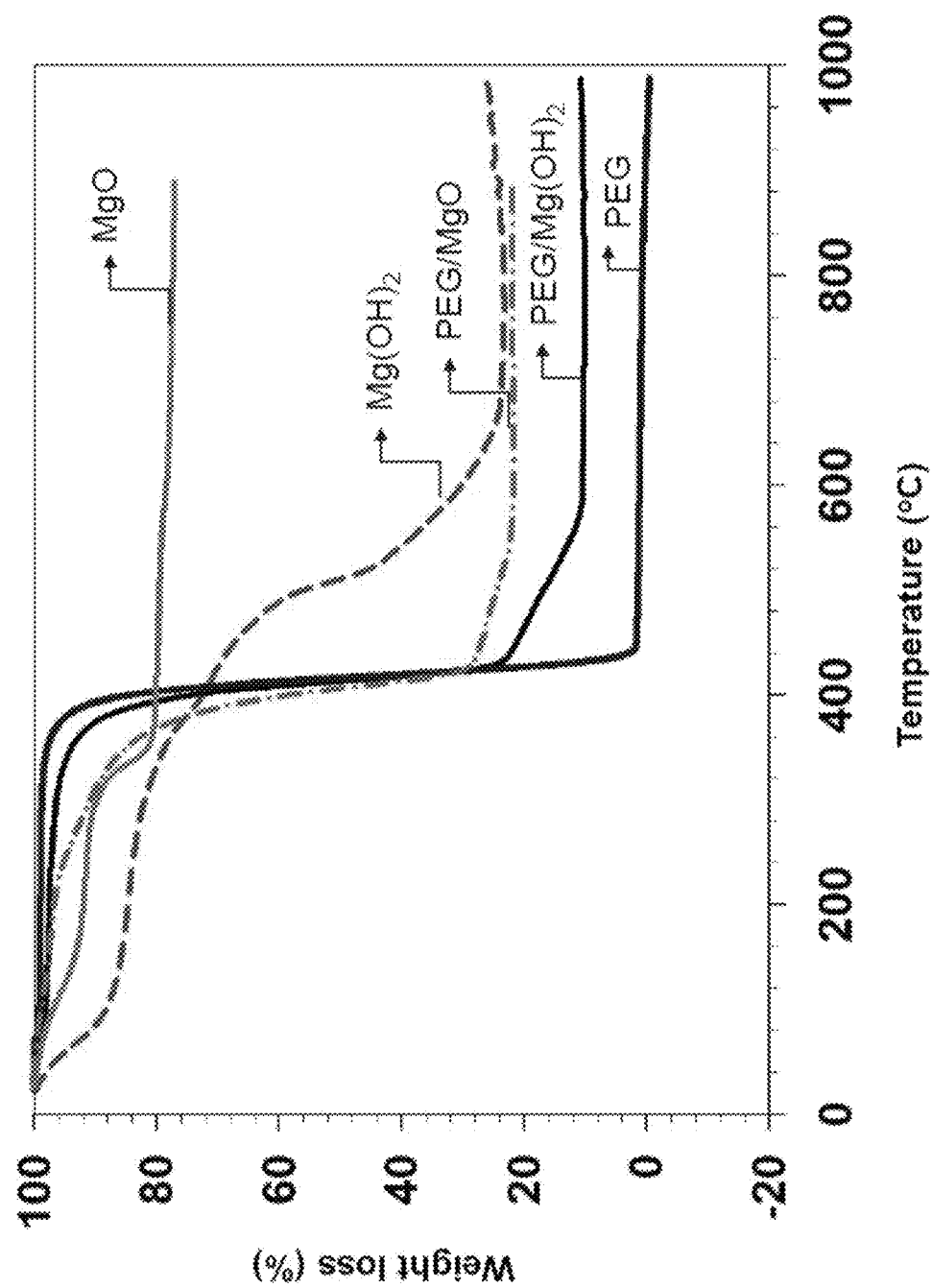
FIG. 9 shows TGA curves of MgO, $Mg(OH)_2$, PEG/MgO, PEG/$Mg(OH)_2$, and pure PEG samples.

The TGA analyses of the hydrothermally treated powders were carried out in a $N_2$ flow and with a heating rate of 5° C./min. The TGA curves for pure PEG, MgO, as-prepared $Mg(OH)_2$, and the $PEG/Mg(OH)_2$ composite are shown in FIG. 9. The initial weight loss of the MgO sample is 12% when heated to 200° C. due to the removal of absorbed $H_2O$ and OH groups. In the $2^{nd}$ step, approximately 8% weight loss occurs in the temperature range 370° C. to 800° C. due to the oxidation of residual organic components and the removal of chemically adsorbed water. See Agnieszka A. P, Lukasz K, Teofil J, Recent development in the synthesis, modification and application of $Mg(OH)_2$ and MgO: A review. *Powder Tech.* 2017, 319, 373-407, incorporated herein by reference in its entirety. $Mg(OH)_2$ starts to lose weight just after the heating is commenced; around 70% is lost upon heating to 650° C. There are two main zones in the weight loss of $Mg(OH)_2$. As shown in FIG. 9, the as-synthesized PEG/MgO and $PEG/Mg(OH)_2$ PCMs exhibit exceptional thermal stability below 380° C., which is much higher than the phase transition temperature of PEG, and the weight loss curves of all samples contain only one step. Note that in practical heat storage applications, the thermal stability of the PCM is another important index. The addition of PEG can enhance the hydrophobic properties of $Mg(OH)_2$, which probably improves its stability and extends its application possibilities as an active filler. See Agnieszka P, Iwona L, Marcin W, Dominik P, Teofil J. Synthesis of $Mg(OH)_2$ from magnesium salts and $NH_4OH$ by direct functionalization with poly(ethylene glycols), *Physicochem. Probl. Miner. Process.* 2012, 48(2), 631-643, incorporated herein by reference in its entirety. For the $PEG/Mg(OH)_2$ PCMs sample, no mass loss was observed below 420° C., indicating thermal stability to this point.

In a nitrogen atmosphere heated at 500° C., the weight loss of PEG-6000 is 95.97%, which corresponds to the pyrolysis of the PEG functional groups. For the pure PEG sample, weight loss starts at approximately 380° C., and the total weight loss percentage reaches 100% at 420° C. The TGA analysis shows that the as-synthesized $PEG/Mg(OH)_2$ powders decompose into $CO_2$ and MgO near 400° C. The weight loss of the porous $PEG/Mg(OH)_2$ is almost 100% during heating up to 420° C. due to the removal of the absorbed water and hydroxyl groups. Note that the $PEG/Mg(OH)_2$ sample has a higher thermal stability than PEG/MgO. The weight loss of $Mg(OH)_2$ commences at around 10° C. and that of MgO near 100° C. whereas the weight loss of $PEG/Mg(OH)_2$ starts from 220° C. Thus PEG is homogeneously dispersed into the porous $Mg(OH)_2$ support and strongly attached to the pore wall. The total weight loss percentage arising for the $PEG/Mg(OH)_2$ composite is 78.2% upon heating up to 500° C.

These results show that the porous $Mg(OH)_2$ support improves the thermal stability of PEG by creating a defensive barrier. Ethanol and PEG-6000 can work effectively as a dispersing agent and reduce the average size of $Mg(OH)_2$ sample by preventing particle reunion. See Hu N, Wu Z P, Wang G W, Wen P, Qian W. Preparation of Ultrafine Magnesium Hydroxide with Two Kinds of Dispersing Agent, Proceedings of 2012 Inter. Conference on Mechanical Eng and Mater Science (MEMS 2012). As a result, it can be concluded that PEG is highly dispersed inside the mesopores in the case of $PEG/Mg(OH)_2$ but probably not in the case of PEG/MgO.

EXAMPLE 11

Thermal Properties of the PEG/MgO and $PEG/Mg(OH)_2$ composites

Figure 10A:
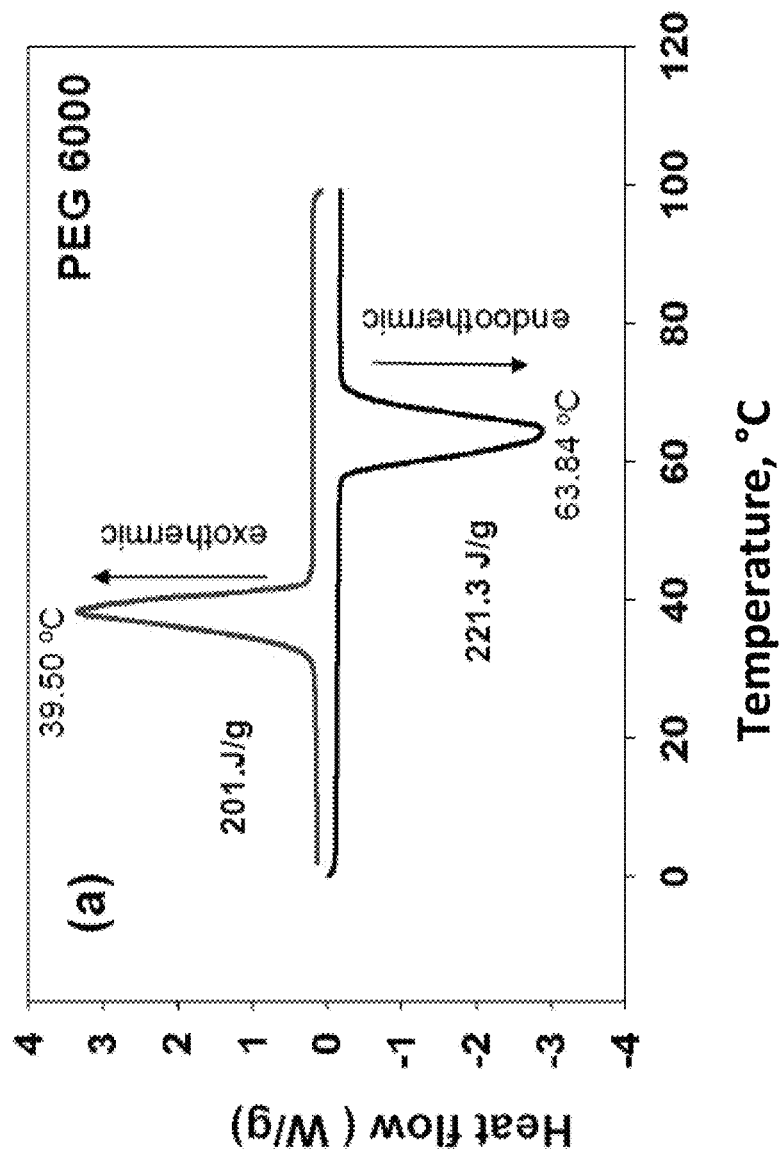
FIG. 10A shows the melting and freezing DCS curves of PEG-6000.
Figure 10B:
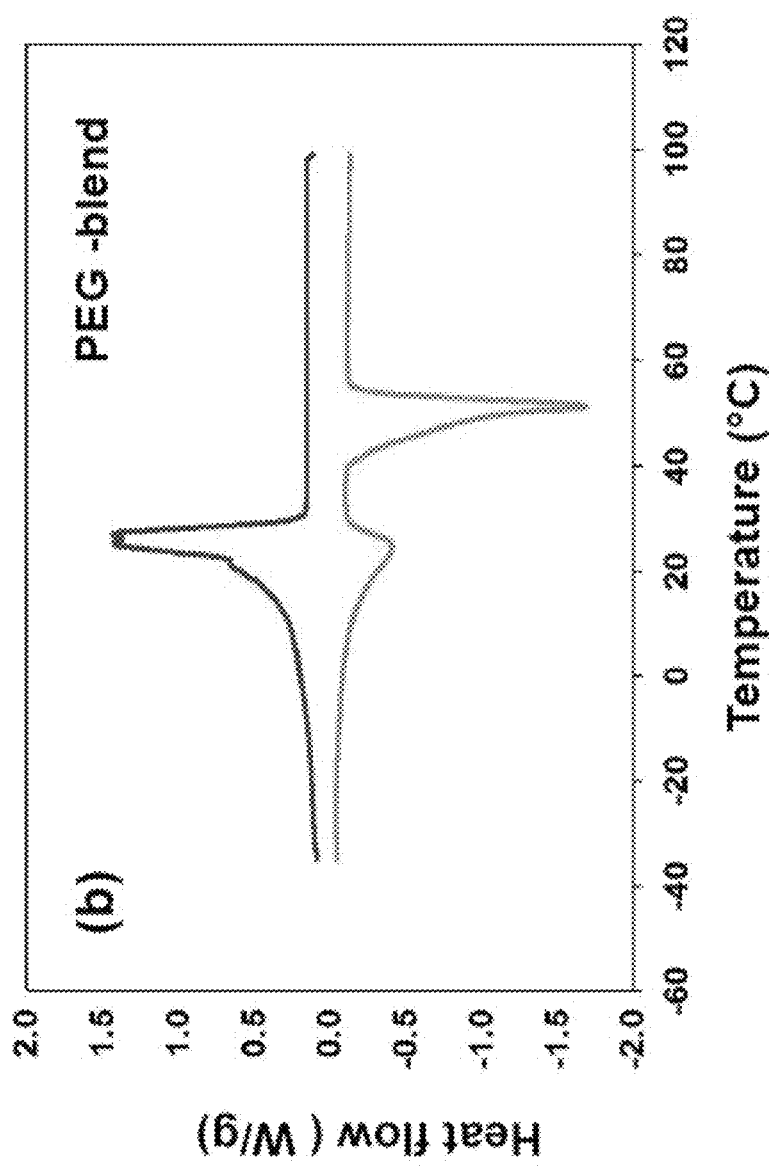
FIG. 10B shows the melting and freezing DCS curves of PEG 1000+6000 PCM sample.

PEG has a melting temperature range that can be tuned from 32° C. to 60.7° C. by varying its molecular weight. Niazi et al. reported that PEG-1000 and PEG-6000 can be mixed and/or mutually dissolved by heating. See Niazi S K., Handbook of Pharmaceutical Manufacturing Formulations: Semisolid Products, 2016. Therefore, the melting point of a 1:1 wt % mixture of PEG samples with molecular weights of 6000 and 1000 was determined to control the melting temperature of PEG to the desired range. FIGS. 10A and 10B show the melting-freezing curves of PEG-6000 and the PEG blend, respectively.

Figure 11A:
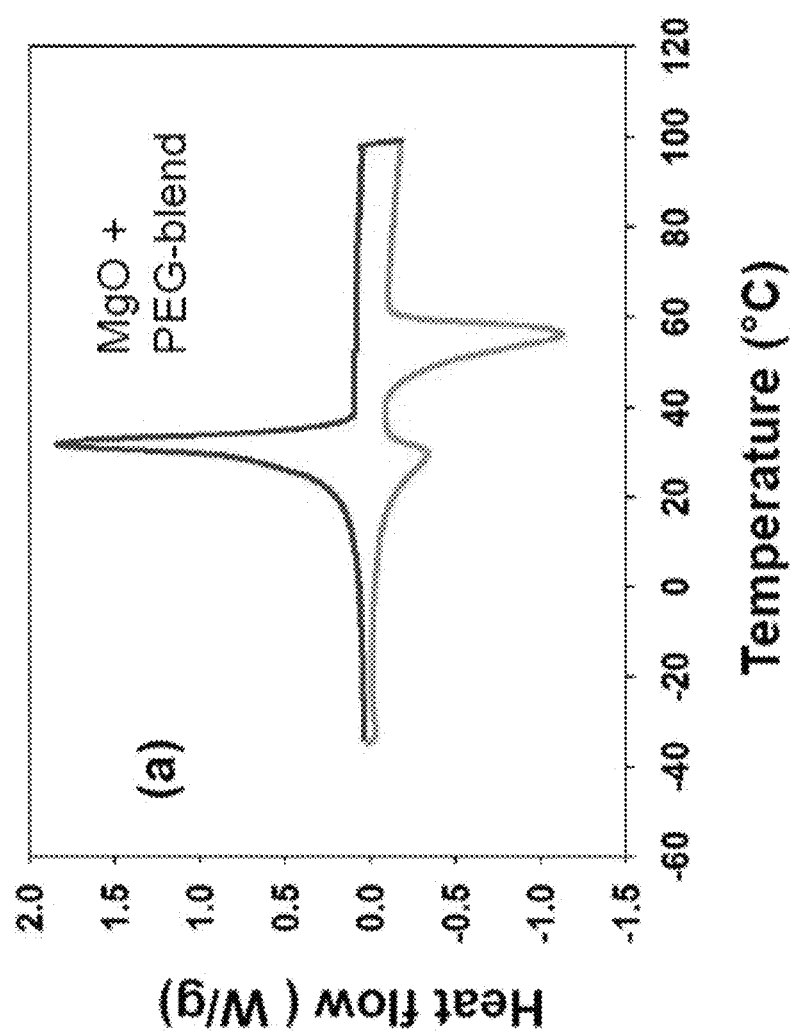
FIG. 11A shows the melting and freezing DCS curves of MgO+(PEG-1000+6000)
Figure 11B:
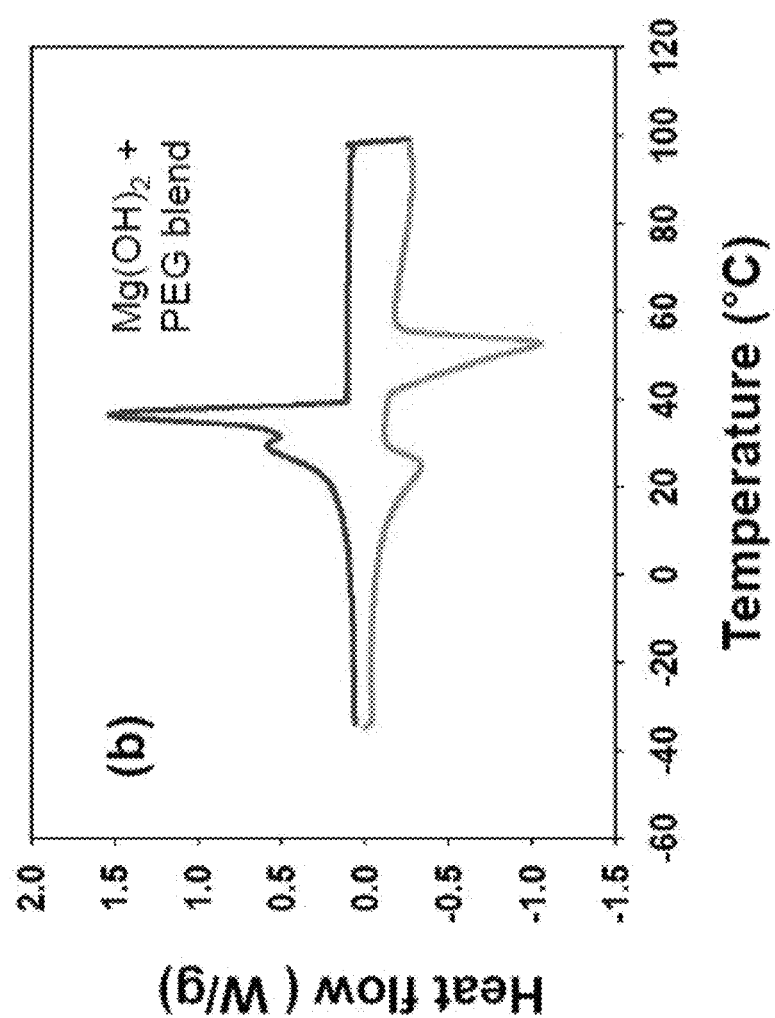
FIG. 11B shows the melting and freezing DCS curves of $Mg(OH)_2$+(PEG 1000+6000)

Pure PEG-6000 has a melting point of 55.30° C. and a freezing point of 28.50° C. (FIG. 10A). FIG. 10A shows that the latent heat of PEG-6000 is 221.3 $Jg^{-1}$ (melting temperature $T_m$=63.84° C.), i.e., PEG-6000 has a high latent heat value, which is due to its linear polymer chain ($CH_2$—$CH_2$—O)$_n$ with hydroxyl groups on two ends. In addition, PEG-6000 crystallizes readily. In the case of the PEG blend, one sharp melting peak and also a minor broad undesired peak in the melting curve region are evident (FIG. 10B). The intensity of the minor peak increases after the $2^{nd}$ and $3^{rd}$ cycles. Initially, it was thought that this minor peak was due to the improper mixing of PEG-1000 and PEG-6000. However, when the thermal properties of PEG-1000 alone were examined; a split peak was observed in both the melting and freezing curves. The MgO/PEG blends (FIG. 11A) and $Mg(OH)_2$/PEG blends (FIG. 11B) also produce additional peaks. PEG-based polymeric solid-solid PCMs exhibit problematic properties during thermal energy storage if the molecular weight of the PEG is below 4000. Therefore, the remainder of the PCM samples were prepared with PEG-6000 (PEG) as the functional phase.

Figure 11C:
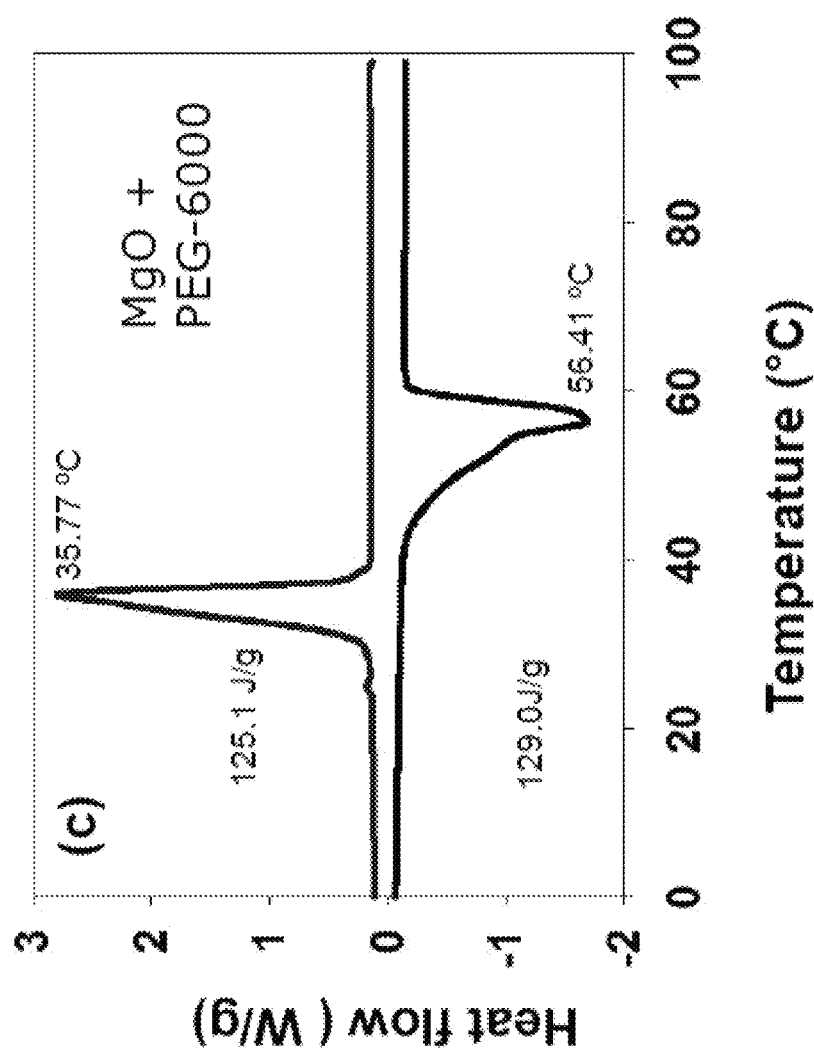
FIG. 11C shows the melting and freezing DCS curves of MgO-PEG-6000
Figure 11D:
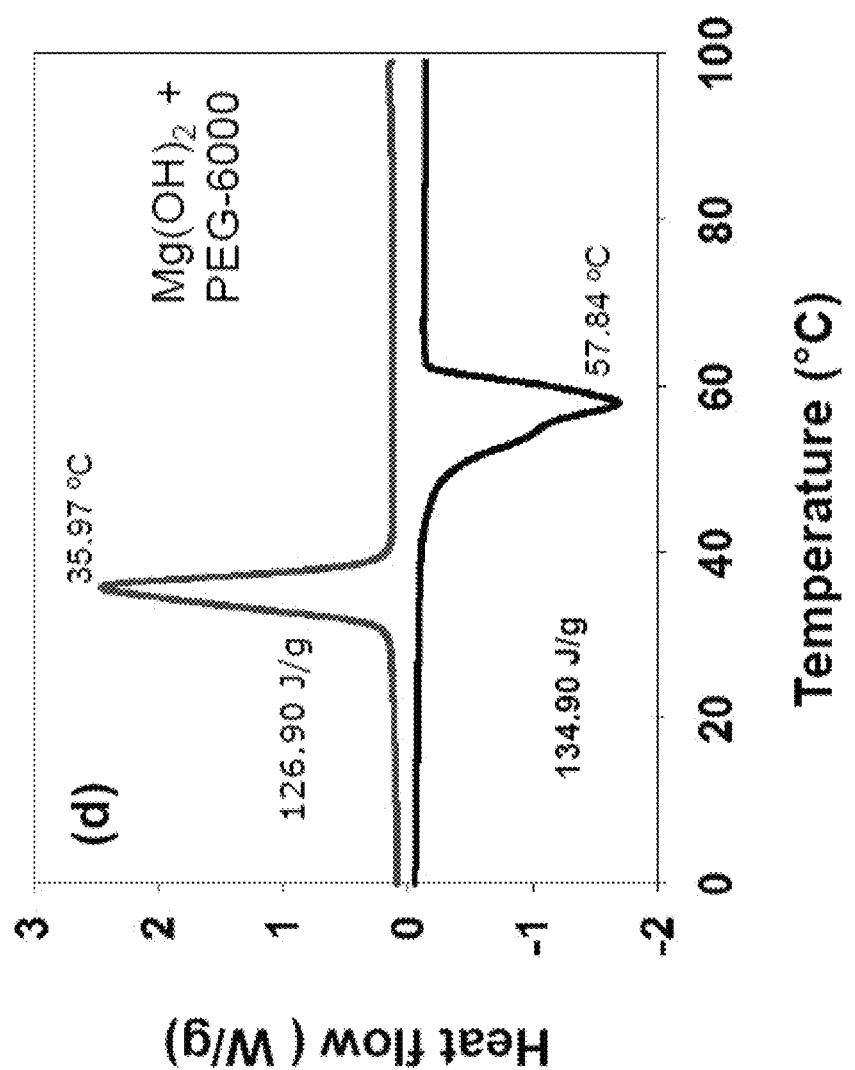
FIG. 11D shows the melting and freezing DCS curves of $Mg(OH)_2$+PEG-6000 PCM sample.

The melting point of the PEG/MgO sample is 56.41° C. and the freezing point is 35.77° C., as shown in FIG. 11C. The latent heat value was found to be 129 J/g during melting. A very small peak is evident in the freezing region near the sharp peak during freezing (FIG. 11C). For $PEG/Mg(OH)_2$, in contrast, the melting point is 57.84° C. and the freezing point is 35.97° C. as shown in FIG. 11D. A narrow pore structure can reduce the melting temperature of PCMs, as is evident in the case of the $Mg(OH)_2$ samples. The latent heat value is 134 J/g during melting (FIG. 11D). For PEG/MgO, a value lower than that of pure PEG is obtained, probably due to the presence of the porous MgO matrix in the composite.

Figure 12A:
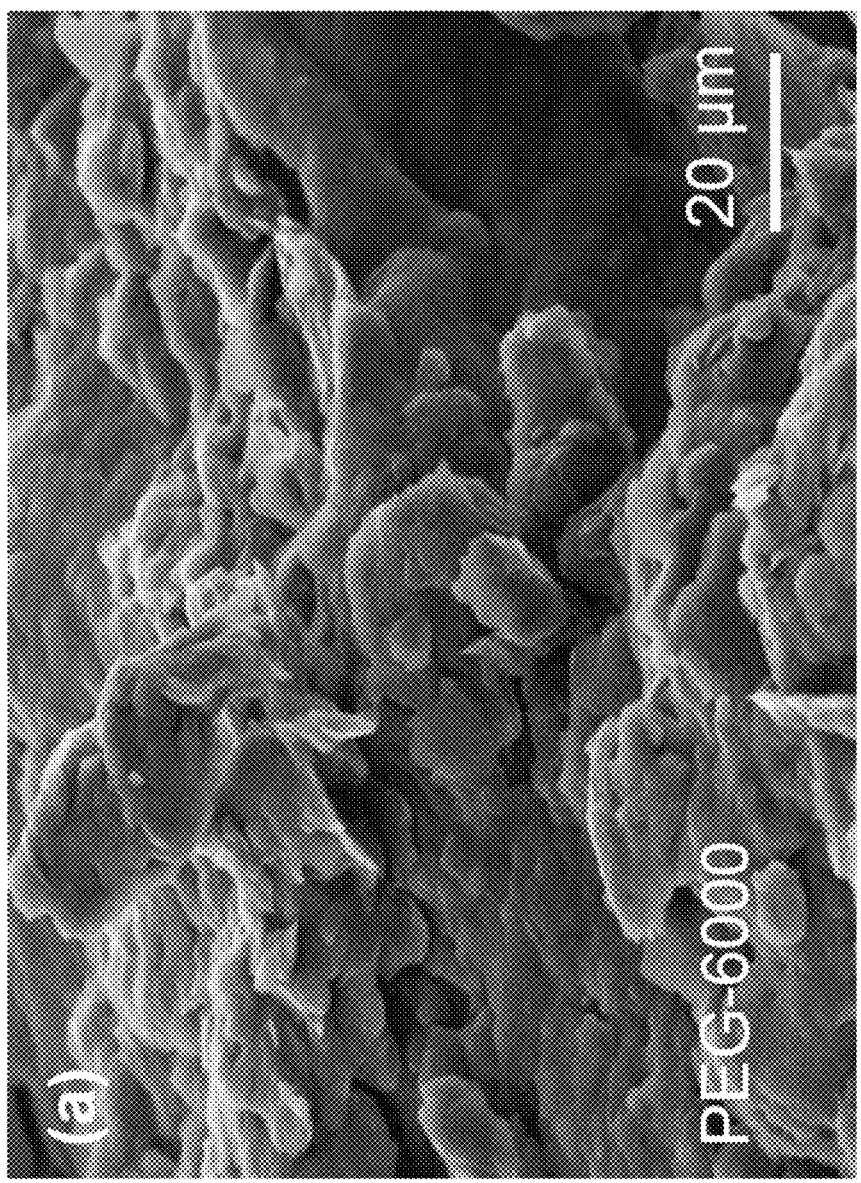
FIG. 12A shows an FE-SEM image of PEG-6000.
Figure 12B:
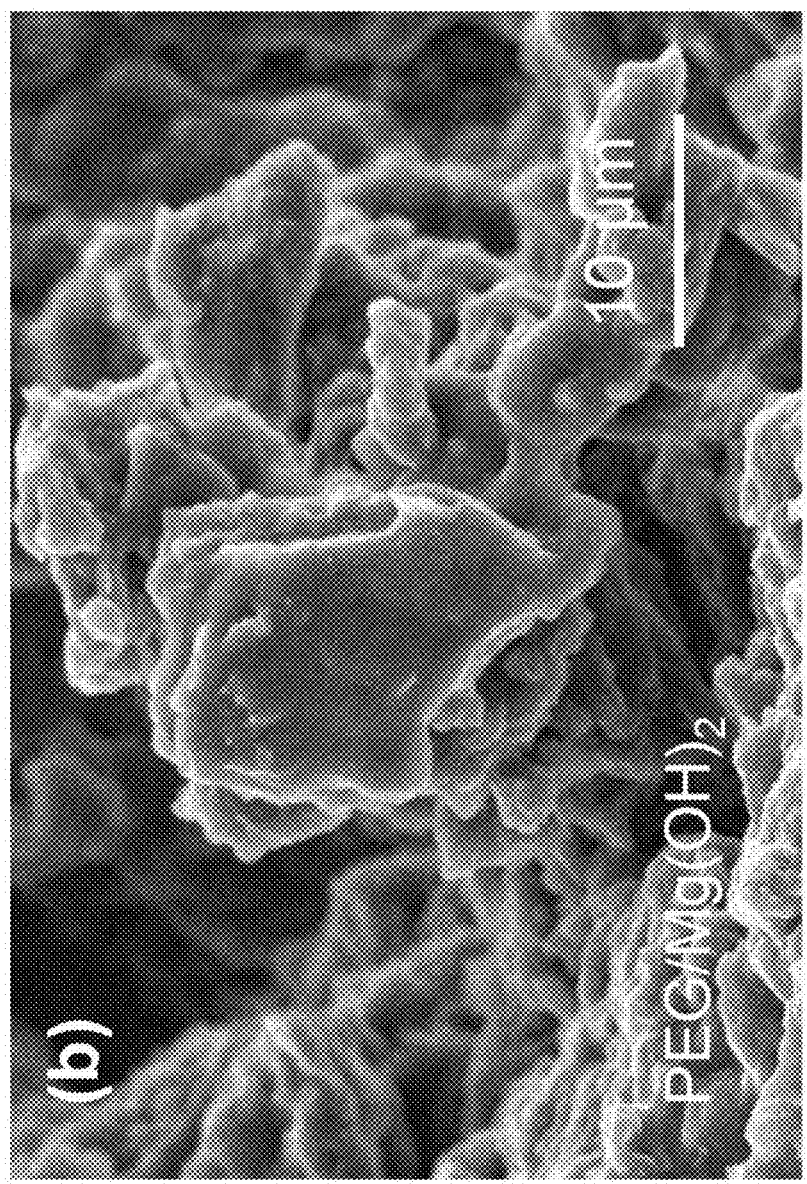
FIG. 12B shows an FE-SEM image of PEG/Mg(OH).
Figure 12C:
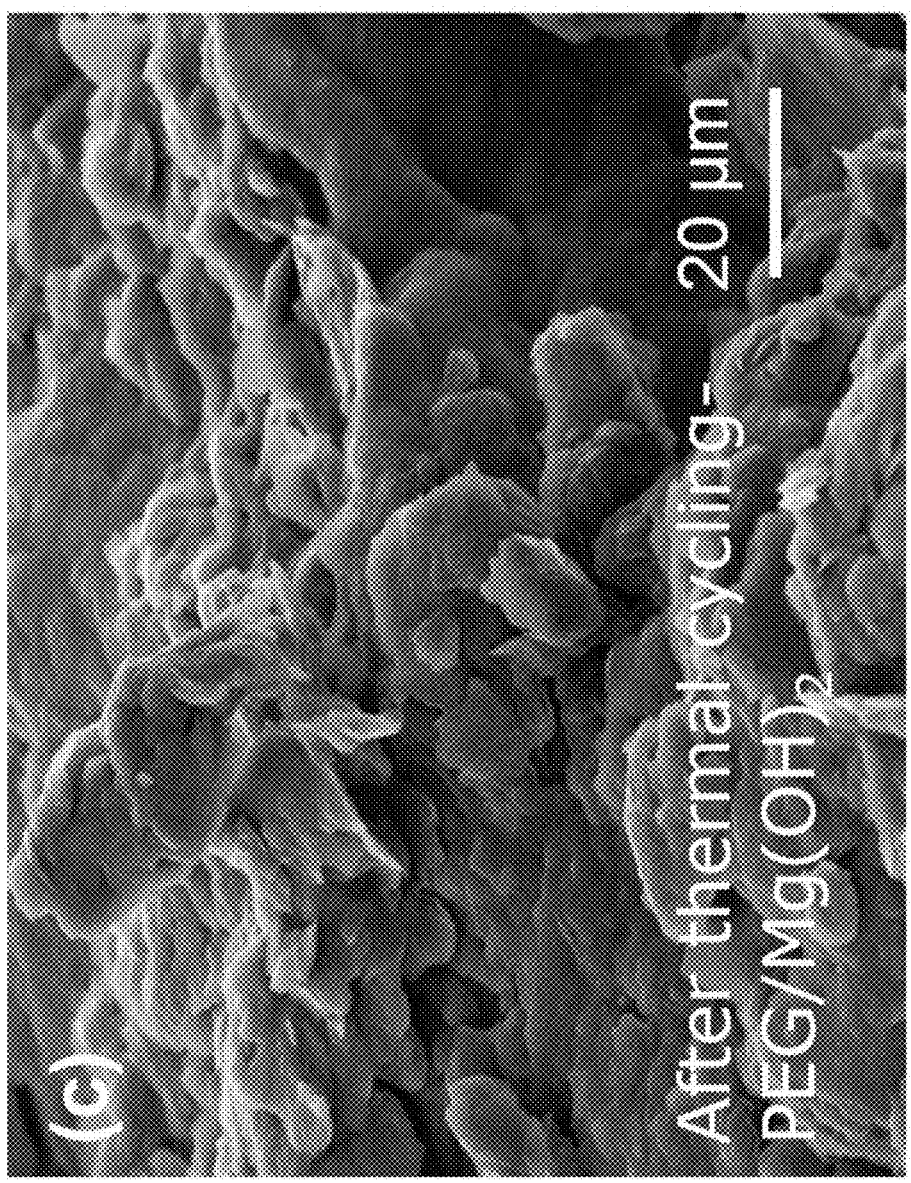
FIG. 12C shows an FE-SEM image of PEG/Mg(OH) after thermal cycling.

The thermal cycling tests show that the $PEG/Mg(OH)_2$ blend provides excellent thermal reliability over at least 10 melting/solidifying cycles, which demonstrates that the $Mg(OH)_2$ matrix enhances the thermal reliability of the PCM. The microstructures and phase change properties of the composite are unchanged after the thermal cycles (FIGS. 12A-C). The SEM analysis of the PEG/Mg(OH)$_2$ composite shows that large amounts of PEG occupy the pores, i.e., PEG is well-dispersed on the surface of the Mg(OH)$_2$ porous structure because of stabilization by capillary forces and the surface tension (FIGS. 12A-C). It can be concluded that an adequate amount of PEG (0.5 g) can be encapsulated within the pores in Mg(OH)$_2$ (0.2 g). The FTIR spectrum and DSC curve of the PEG/Mg(OH)$_2$ PCMs are almost completely unaffected by thermal cycling, which indicates that PEG/Mg(OH)$_2$ has excellent thermal reliability and reusability.

The thermal properties of the composite PCMs, including the melting temperature ($T_m$), the latent heat in the heating process ($\Delta H_m$), the freezing temperature (crystallizing temperature) ($T_c$), and the latent heat in the cooling process ($\Delta H_c$), are shown in Table 1. In Table 1, it can be seen that a heat latent value of 134.90 J/g was obtained for the PEG/Mg(OH)$_2$ sample, which is the highest value among the tested and reference samples. In addition, the same sample was found to have a value of supercooling that is the lowest of all the tested samples. Supercooling is a state where liquids do not solidify even below their normal freezing point. Supercooling can cause mainly two types of problems: (i) the freezing temperature may not fall within the temperature range controlled by a system, and (ii) the energy consumption can increase. As a result, the whole heat storage system may become jeopardized, leading to increased costs.

The prepared Mg(OH)$_2$ is a mesoporous material that supports PEG and provides mechanical strength to the composite. As a result, the ss-CPCM retains its shape in the solid state and does not permit seepage of the liquefied PEG. Leakage of melted PEG from the surfaces of the PCMs is prevented even after mixing 0.5 g PEG with 0.2 g Mg(OH)$_2$ supporting material. The flower-type texture of Mg(OH)$_2$ enhances the mixing with PEG.

Thermal conductivity: MgO and Mg(OH)$_2$ were chosen as support materials because MgO has a higher thermal conductivity (~48.4 W m$^{-1}$ K$^{-1}$), while the conductivity of polyethelye glycol polymer is very low, only 0.2985 W m$^{-1}$ K$^{-1}$.

Disadvantages of using PEG alone: PEG polymer has the two drawbacks of leaking during PCM phase transition processes and low thermal conductivity.

Advantages of Inorganic porous materials: Porous materials have high demand in many industrial fields. In particular, inorganic porous materials are essential for gas storage, separation, adsorption, catalysis, sensor, biofiltration, and drug storage.

EXAMPLE 12

The preparation and characterization of shape-stabilized PEG/MgO and PEG/Mg(OH)$_2$ composites demonstrated the fabrication of a novel solid-liquid phase change material. The supporting materials MgO and Mg(OH)$_2$ were prepared in the presence of various precipitating agents with the hydrothermal method at 200° C. for 24 h. The PEG/Mg(OH)$_2$ composite was found to exhibit performance as a PCM superior to that of the PEG/MgO composite. Comparison of the PEG/MgO and PEG/Mg(OH)$_2$ systems demonstrated that Mg(OH)$_2$ can be used as a supporting material for PEG-6000. Mg(OH)$_2$ samples prepared with PA had a mesoporous structure with a narrow pore size distribution, and the narrow pore structure is likely to play a vital role in the mitigation of supercooling effect as well as supporting its high latent heat value. These properties indicate that the synthesized Mg(OH)$_2$ composites are promising materials with good thermal stability for solar energy storage. The PEG/Mg(OH)$_2$ composite PCM might be a suitable candidate for building materials in the hot summer, where building materials heat to temperatures around 36-57° C. A blend of PEG with MgO and Mg(OH)$_2$ was also tested for suitable temperature range finding.

Heat energy storage systems were fabricated with the impregnation method by using MgO and Mg(OH)$_2$ as supporting materials and polyethylene glycol (PEG-6000) as the functional phase. MgO and Mg(OH)$_2$ were synthesized from the salt Mg(NO$_3$)$_2$.6H$_2$O by performing hydrothermal reactions with various precipitating agents, specifically NaOH, KOH, NH$_3$, NH$_3$ with pamoic acid (PA), or (NH$_4$)$_2$CO$_3$. Our results show that the selection of the precipitating agent has a significant impact on the crystallite structure, size, and shape of the final products. Of the precipitating agents tested, only NaOH and NH$_3$ with PA produce single-phase Mg(OH)$_2$ as the as-synthesized product. The MgO and Mg(OH)$_2$ matrices both prevent the leakage of liquid PEG during the phase transition of the phase change material (PCM). The PEG/Mg(OH)$_2$ PCM exhibits reproducible behavior over a large number of thermal cycles. Pore size distribution analyses revealed that the surfaces of the as-synthesized MgO have a slit-like pore structure whereas the as-synthesized Mg(OH)$_2$ has a mesoporous structure with a narrow pore size distribution; this structure was found to enhance the latent heat of the PCM as well as to mitigate supercooling. The PEG/Mg(OH)$_2$ PCM exhibits a higher latent heat value, a higher thermal storage efficiency, and less supercooling than the PEG/MgO PCM. These results were confirmed with differential scanning calorimetry (DSC) and thermogravimetric analysis (TGA), and the characteristics of the PCMs were investigated by using SEM,

TABLE 1

Comparison of commercial PEG with ss-CPCM.

| PCM | Thermal Conductivity | Melting enthalpy J/g | Solidification enthalpy J/g | Supercooling | Melting Temperature [° C.] | Solidification Temperature [° C.] | Flammability |
| --- | --- | --- | --- | --- | --- | --- | --- |
| Commercial polyethylene glycol polymer | 0.2985 W m$^{-1}$ K$^{-1}$ | 221.3 | 201.3 | 25 | 63.84 | 39.00 | Highly flammable |
| New composite product (ss-CPCM) | ~48.4 W m$^{-1}$ K$^{-1}$ [for MgO], 30 W m$^{-1}$ K$^{-1}$ [for new product] | 134 | 127 | 19 (very low) | 57 | 37 | Mg(OH)$_2$ is a non-flammable compound, not toxic, very inexpensive |

TEM, XPS, XRD, and FTIR spectroscopy. The latent heat values of PEG-1000/PEG-6000 blends with MgO and $Mg(OH)_2$ were also determined with a view to extending the application of the PCMS to energy storage over wider temperature ranges.

The invention claimed is:

1. A heat storage material, comprising:
   10-50 wt % mesoporous $Mg(OH)_2$, and
   50-90 wt % phase change material, each relative to a total weight of the heat storage material,
   wherein the mesoporous $Mg(OH)_2$ is in the form of particles with an average diameter in a range of 100 nm-1 µm,
   wherein the mesoporous $Mg(OH)_2$ has pores with an average pore size in a range of 5-15 nm,
   wherein 10-100 wt % phase change material relative to a total weight of the phase change material is located within the pores, and
   wherein the phase change material is an organic compound.

2. The heat storage material of claim 1, wherein the mesoporous $Mg(OH)_2$ is in the form of nanoplatelets, the nanoplatelets having an average diameter in a range of 400-700 nm and an average thickness in a range of 1-20 nm.

3. The heat storage material of claim 1, wherein the mesoporous $Mg(OH)_2$ has a surface area in a range of 40-80 $m^2/g$.

4. The heat storage material of claim 1, wherein the mesoporous $Mg(OH)_2$ is crystalline with a lattice spacing in a range of 0.260-0.300 nm.

5. The heat storage material of claim 1, wherein the organic compound is at least one selected from the group consisting of polyethylene glycol, polyethylene, polypropylene, polyamide, polycarbonate, polyimide, poly(butadiene), poly(isoprene), poly(hydrogenated butadiene), polyetherester elastomer, ethylene/propylene/diene (EPDM) polystyrene, polyvinyl chloride, paraffin, and sugar alcohol.

6. The heat storage material of claim 5, wherein the organic compound is polyethylene glycol, and
   wherein the heat storage material consists essentially of $Mg(OH)_2$ and polyethylene glycol.

7. The heat storage material of claim 5, wherein the phase change material consists essentially of polyethylene glycol having a weight average molecular weight in a range of 4,000-8,000 Da.

8. The heat storage material of claim 1, which is substantially free of aluminum.

9. The heat storage material of claim 1, further comprising mesoporous MgO in contact with the mesoporous $Mg(OH)_2$.

10. The heat storage material of claim 1, wherein the phase change material has a melting point in a range of 50-65° C.

11. The heat storage material of claim 1, wherein the phase change material has a freezing point in a range of 30-40° C.

12. The heat storage material of claim 1, which has a cooling latent heat in a range of 130-140 J/g.

13. The heat storage material of claim 1, which has a solidification enthalpy in a range of 120-135 J/g.

14. The heat storage material of claim 1, which has a thermal conductivity in a range of 25-45 $W \cdot m^{-1} \cdot K^{-1}$.

15. The heat storage material of claim 1, wherein less than 10 wt % of the phase change material located in the pores, relative to a total weight of the phase change material located in the pores, exits the pores when the phase change material undergoes a melting or a solidifying transition.

16. The heat storage material of claim 1, wherein 80-100 vol % of a total pore volume is occupied by the phase change material.

17. A method for forming the heat storage material of claim 1, the method comprising:
   hydrothermally reacting $Mg(NO_3)_2$, pamoic acid, and $NH_3$ in water in a closed vessel at a temperature in a range of 180-250° C. for 18-30 h to form a suspended precipitate,
   washing and drying the suspended precipitate to form mesoporous $Mg(OH)_2$,
   mixing the mesoporous $Mg(OH)_2$ with the phase change material in an organic solvent to form a mixture, and
   drying the mixture to form the heat storage material.

18. The method of claim 17, further comprising heating the mesoporous $Mg(OH)_2$ for 1-6 h at a temperature in a range of 300-500° C.

19. The method of claim 17, wherein the mixture comprises the phase change material at a concentration in a range of 2-7 g/L.

20. A building material comprising the heat storage material of claim 1.

* * * * *